United States Patent
Harper, Jr.

(10) Patent No.: US 9,718,702 B2
(45) Date of Patent: Aug. 1, 2017

(54) METHOD FOR TREATING DENSE DEEPWATER FROM LAKE KIVU

(71) Applicant: Harper Biotech LLC, Villanova, PA (US)

(72) Inventor: Charles L. Harper, Jr., Villanova, PA (US)

(73) Assignee: Harper Biotech LLC, Villanova, PA (US)

( * ) Notice: Subject to any disclaimer, the term of this patent is extended or adjusted under 35 U.S.C. 154(b) by 0 days.

(21) Appl. No.: 15/058,756

(22) Filed: Mar. 2, 2016

(65) Prior Publication Data

US 2016/0257577 A1    Sep. 8, 2016

Related U.S. Application Data

(60) Provisional application No. 62/126,874, filed on Mar. 2, 2015.

(51) Int. Cl.
  *C02F 3/32* (2006.01)
  *C02F 1/20* (2006.01)
  (Continued)

(52) U.S. Cl.
  CPC ............ *C02F 1/20* (2013.01); *B01D 19/0036* (2013.01); *B01D 19/0068* (2013.01);
  (Continued)

(58) Field of Classification Search
  CPC .... C02F 1/20; C02F 3/322; C02F 1/52; C02F 1/66; C02F 2103/007; B01D 9/0068;
  (Continued)

(56) References Cited

U.S. PATENT DOCUMENTS

| | | | |
|---|---|---|---|
| 3,195,271 A | 7/1965 | Golueke et al. | |
| 3,780,471 A | * 12/1973 | Ort | A01G 33/00 210/170.09 |

(Continued)

FOREIGN PATENT DOCUMENTS

| | | |
|---|---|---|
| EP | 2093197 A1 | 8/2009 |
| WO | WO 2015/137227 A1 * | 9/2015 |

OTHER PUBLICATIONS

Boehrer et al. (2008). Stratification of lakes. Revs. Geophys. 46, RG 2005, pp. 1-27.

(Continued)

*Primary Examiner* — Fred Prince
(74) *Attorney, Agent, or Firm* — Caesar Rivise, PC

(57) ABSTRACT

A method and system are disclosed for total degassing ($CH_4+CO_2$) and density-reducing treatment of dense Lake Kivu deepwater. The invention allows hyper-efficient oxy-fuel power generation with return flow water reinjection density-matched at or above ~150 m without necessity to admix biozone (<80 m) water. This increases the $CH_4$ resource and deflates the gas-rich deepwater layer over time, making Lake Kivu safe against a catastrophe threatening up to 2 million lives. Deepwater from the Main Resource Zone (MRZ, ~480 m to ~260 m) is de-densified, then reinjected above the Potential Resource Zone (PRZ, ~260 m to ~180 m) within the Intermediate Zone (IZ, ~180 m to ~80 m), avoiding wasteful resource dilution of the MRZ or PRZ reserves, and allowing methane extraction from the PRZ and IZ. The water treatment process produces valuable algal biomass and co-harvests Mg-hydroxide in vast amounts, allowing value expansion by massive production of bioproducts and $CO_2$-absorbing eco-cements, concretes and related products.

16 Claims, 5 Drawing Sheets

(51) Int. Cl.
*C02F 1/52* (2006.01)
*C02F 1/66* (2006.01)
*B01D 19/00* (2006.01)
*F03B 17/06* (2006.01)
*C02F 103/00* (2006.01)

(52) U.S. Cl.
CPC .............. *C02F 3/322* (2013.01); *F03B 17/06* (2013.01); *C02F 1/52* (2013.01); *C02F 1/66* (2013.01); *C02F 2103/007* (2013.01); *Y02E 10/28* (2013.01); *Y02P 70/527* (2015.11); *Y02W 10/37* (2015.05)

(58) Field of Classification Search
CPC ....... B01D 9/0036; F03B 17/06; Y02E 10/28; Y02W 10/37; Y02P 70/527
USPC .......... 210/602, 631, 188, 252, 259, 170.09, 210/747.5
See application file for complete search history.

(56) References Cited

U.S. PATENT DOCUMENTS

| | | | |
|---|---|---|---|
| 4,394,846 | A | 7/1983 | Roels |
| 5,263,322 | A | 11/1993 | Molini |
| 8,101,080 | B2 | 1/2012 | Robinson et al. |
| 2010/0112649 | A1 | 5/2010 | Willson et al. |
| 2010/0230353 | A1* | 9/2010 | Kerr ................... B01D 15/1892 210/657 |
| 2012/0061315 | A1 | 3/2012 | Grott |
| 2012/0175308 | A1 | 7/2012 | Jangbarwala et al. |
| 2013/0295623 | A1 | 11/2013 | Gardner et al. |
| 2013/0319059 | A1 | 12/2013 | Chen et al. |
| 2014/0076817 | A1 | 3/2014 | Dennis et al. |
| 2015/0354451 | A1 | 12/2015 | Harper, Jr. |

OTHER PUBLICATIONS

Boehrer et al. (2009). Density stratification and stability. In: Encyclopedia of Inland Waters (2009), Editor: Likens, G. E., vol. 1, pp. 583-593.
Chi et al. (2011). Bicarbonate produced from carbon capture for algae culture. Trends in Biotechnology, 29 (11): pp. 537-541.
Chi et al. (2014). Selection of Microalgae and Cyanobacteria Strains for Bicarbonate-Based Integrated Carbon Capture and Algae Production System. Applied Biochem. Biotech., v.172: pp. 447-457.
Chi et al. (2013). Bicarbonate-based integrated carbon capture and algae production system with alkalihalophilic *cyanobacterium* Bioresource Tech., v.133: pp. 513-521.
Clean Energy Systems, Inc. (2006) Project report for the California Energy Commission, "Durability and Reliability Demonstration of a Near-Zero-Emission Gas-Fired Power Plant," (CEC 500-2006-074): pp. i-71.
Garcia-Pérez et al. (2014). Influence of magnesium concentration, biomass concentration and pH on flocculation of Chlorella vulgaris. Algal Research, v.3: pp. 4-29.
Gonzalez-Ferndandez et al. (2012). Microalgae autoflocculation: An alternative to high-energy consuming harvesting methods. J. Appl. Physcology, v. 25: pp. 991-999.
Golueke et al. (1965). Harvesting and processing sewage-grown planktonic algae. J. Water Pollut. Control Fed., 37 (4): pp. 471-498.
Halbwachs, Methane gas. Kivu Lake. Retrieved on Apr. 27, 2017 from http://mhalb.pagesperso-orange.fr/kivu/eg/index.htm.
Halbwachs, Methane gas extraction. Retrieved on Apr. 27, 2017 from http://mhalb.pagesperso-orange.fr/kivu/eg/eg_2a_extraction.htm.
Hanotu et al (2012). Microflotation performance for algal separation. Biotechnol. Bioeng., 109(7): pp. 1663-1673.
Hanotu et al. (2013). Microalgae recovery by microflotation for biofuel production using metallic coagulants. Biofuels 4(4): pp. 363-369.
Hershey et al. (1983). Densities and compressibilities of aqueous sodium carbonate and bicarbonate from 0 to 45° C. J. Solution Chem., 12(4): pp. 233-254.
Hussain, M. A. (2001). Vacuum degasifier: comprehensive modelling and simulation. Vacuum 60: pp. 325-337.
Ministry of Infrastructure Republic of Rwanda et al. (2010). Management Prescriptions for the Development of Lake Kivu Gas Resources. Ministry of Infrastructure, Republic of Rwanda and Ministry of Hydrocarbons, Democratic Republic of Congo. Prepared by the Expert Working Group on Lake Kivu Gas Extraction. pp. 1-38.
Mook, W. (2000). Chemistry of carbonic acid in water. Chapter 9, pp. 143-165 in: Environmental Isotopes in the Hydrological Cycle: Principles and Applications. INEA / UNESCO, Paris.
Roels et al. (1979). The utilization of cold, nutrient-rich deep ocean water for energy and mariculture. Ocean Management 5(3): pp. 199-210.
Stolaroff, J. K. (2013). Carbonate solutions for carbon capture: a summary. Lawrence Livermore National Laboratory. National Report LLNL-TR-644894: pp. 1-17.
Tassi et al. (2009). Water and gas chemistry at Lake Kivu (DRC): Geochemical evidence of vertical and horizontal ieterogeneities in a multibasin structure. G3: Geochemistry, Geophysics, Geosystems 10(2), DOI: 10.1029/2008GC002191. pp. 1-22.
Tietze, K. (2007). Basic plan for monitoring, regulating and steering exploitation of the unique methane gas deposit in Lake Kivu: safely, environmentally soundly and with optimal yield. Report commissioned by W+S Beteiligungs AG. PDT Gmbh. pp. 1-201.
Vandamme, D. (2013). Flocculation based harvesting processes for microalgae biomass production. PhD Thesis, KU Leuven. pp. i-123.
Vandamme et al. (2014). Reversible Flocculation of Microalgae using Magnesium Hydroxide. Bioeng. Res., 8(2): 716-725 DOI 10.1007/s12155-014-9554-1. pp. 1-10.
Vandamme et al. (2012). Flocculation of Chlorella vulgaris induced by high pH: role of magnesium and calcium and practical implications. Bioresource Technology, 105: pp. 114-119.
Vandamme et al. (2013). Flocculation as a low-cost method for harvesting microalgae for bulk biomass production. Trends Biotechnol., 31(4): 233-239.
Wuest et al. (2009). Modelling the reinjection of deep-water after methane extraction in Lake Kivu. EAWAG Report (Kastanienbaum, Switzerland). pp. 1-141.
Wuest et al. (2012). Methane Formation and Future Extraction in Lake Kivu. pp. 165-180. Chapter 10 in: Descy et al., 2012.

* cited by examiner

METHOD FOR TREATING DENSE DEEPWATER FROM LAKE KIVU

BACKGROUND OF THE INVENTION

1. Field of Invention

Extraction and use of a unique resource of dissolved natural gas in Lake Kivu (Rwanda-DR Congo) deepwater, addressing especially problems and opportunities of post-degassing water flow and reinjection, and overall engaging five factors of optimization: (i) lake safety; (ii) productive utilization of additional deepwater resources; (iii) methane extractive efficiency, including tapping additional resource zones; (iv) CO2 degassing and capture with high efficiency power production; and (v) stewardship of the lake's extraordinary beauty and ecosystem.

2. Description of Related Art

Demand for electrical power is expanding rapidly in the region of Lake Kivu. As untapped hydropower resources are limited, rapidly increasing electric power demand has been supplied by banks of diesel engine generators consuming fuel imported from the East African coast with power costs sometimes exceeding US$0.44/kWh. This trend burdens local economies. It is a pressing matter, for example, in the case of Rwanda's fast-growing economy, where a Government agenda has been to expand power generation capacity by close to a factor of four in two years' time remaining to meet a longstanding 2017 goal. Such high cost power is unattractive to the kinds of new businesses required to boost Rwanda into higher levels of industrializing business activity needed for long-term growth in per capita productivity and income.

Lake Kivu contains an estimated 32 million tonnes (approximately 1.5 trillion cubic feet, TCF) of natural gas trapped in convectively isolated deepwater below 260 meters. This bottom zone is called the "Main Resource Zone" (MRZ). (Many scientific perspectives on Lake Kivu are presented in the papers collected together in a comprehensive 2012 book edited by Descy et al.) The trapped gas resource in the MRZ has the capability to provide approximately 800 megawatts continuous power over a period of 40 years if extracted and combusted with high efficiency. An additional amount of natural gas, roughly 6 million tonnes, is trapped in another, higher level, convectively isolated, anoxic layer situated between ~260 and ~200 meters depth. This layer is called the "Potential Resource Zone" (PRZ). Even more methane, approximately 8.6 million tonnes, is trapped above the PRZ in a higher convectively isolated anoxic layer called the "Intermediate Zone" (IZ) in the depth interval ~200 m to ~80 m, just below the convectively oxygenated "biozone" (BZ) existing above ~80 m depth, (Wuest et al., 2009).

Many problems are involved in the extraction and utilization of Lake Kivu methane and in the replacement into Lake Kivu of return flows of deepwater that have been extracted for degassing at or near the surface. No method or system has been described or practiced that could access methane in the PRZ and/or IZ in an efficient manner. Nor has any method or system been described or practiced that could make use of abundant useful additional resources present in Lake Kivu deepwater in connection with an overall system and method for extracting and utilizing the lake's deepwater methane reserves. Nor has any method or system been described or practiced that in doing so substantially increases the safety of Lake Kivu against a mass catastrophe release of the CO2 trapped within its depths triggered by lakebottom volcanism of the type already known to have occurred with catastrophic effect in the past, most recently about 900 years ago. All such goals are important. No closely related art exists pertinent to accomplishing them, with one exception.

In US 2015/0354451 A1, the inventor of the present invention disclosed a method and system for the combination and integration of a Total Degassing System (TDS), an OxyFuel Combustion Power System (OXFCPS), and a Return Flow System (RFS) applied to a type of lake of which Lake Kivu is the only known example of commercially significant size. The RFS is described in a general sense, but there remains room in the art for further development of the method and system and particularly the RFS aspect of same.

A multi-stage CO2 removal method for gas extraction and cleaning has been in use on Lake Kivu since the 1950s with various modifications to the present. In a 2-stage method, the first stage is differential degassing of CH4 and CO2 in upwelling deepwater constrained in an upflow pipe and/or chamber. Deepwater gas typically is degassed at a depth of approximately 20 meters. This depth favors CH4 degassing (~80%) over CO2 degassing (~20%). The next stage is bubbling flow of degassed gas obtained from stage-1 up through a "wash" of biozone water at a near surface pressure. This step further cleans the gas. It redissolves a high fraction of CO2 with loss of only a small fraction of CH4, typically less than 10%, (but depending upon the volume ratio of gas to the washing water it is exposed to factored also by the bubble size distribution and bubble passage exposure time). The process is illustrated helpfully on the web site of Michel Halbwachs (Halbwachs, web site). It was elegantly designed by Belgian engineers in the 1950s for its initial purpose to extract combustible methane from the lake using only water-based processes to remove the very large component of associated CO2. The Belgian design was not created to optimize use of the total stored resource present in the lake. Nor was it developed in view of danger from catastrophic limnic eruption. The phenomenon of limnic eruption was only understood as a consequence of extensive international research funded in the aftermath of deadly eruptions of two small volcanic lakes in Cameroon in the 1980s. The Belgian method also cannot be used to extract methane from Lake Kivu's PRZ or IZ. Methane concentrations in these layers are too low.

The standard technology practiced on Lake Kivu for deepwater methane extraction injects acidic $CO_2$-rich scrubbing water into the biozone. The term scrubbing water corresponds to the flow of near surface water used in gas scrubbing bubble flow gas exchange processes. Scrubbing by bubble flow occurs in tower structures. The interaction of extracted gas with near surface water absorbs $CO_2$ into solution as a means of scrubbing $CO_2$ out of stream of methane-containing gas that typically is degassed at a depth of about 20 meters depth in two-stage degassing systems such as the KP-1 facility on Lake Kivu.

The presence of an estimated ~600 million tonnes of associated $CO_2$ trapped at depth in Lake Kivu in the MRZ and PRZ presents a problematic efficiency challenge for the extraction of conventionally combustible methane. Methane cannot be combusted efficiently in the presence of large amounts of $CO_2$ if conventional methods are used. Pre-combustion separation of $CO_2$ by various technologies requires substantial power loss as well as methane loss or "slip," as well as large capital investment in equipment.

Oxyfuel combustion is applicable to power production from methane in turbines (Jerica and Fesharski, 1995; Clean Energy Systems, 2006; Hammer et al., 2009; Revzani et al., 2009; Woolat and Franco, 2009). The inventor in US 2015/0354451 has disclosed a method and system that shows how oxyfuel combustion allows Lake Kivu gas operations to be technologically upgraded in a way that can solve core aspects of the basic problems described herein. Oxyfuel combustion offers a way to utilize Lake Kivu deepwater gas without need for $CO_2$ separation in the extraction process. This allows dissolved gas to be totally extracted from Lake Kivu deepwater including both methane and $CO_2$, (Hussain 2001).

The presence of so much $CO_2$ trapped at depth in Lake Kivu presents a threat of mass asphyxiation mortality from a possible convective runaway "limnic eruption." An event could be triggered by lake bottom volcanism in the northern sector of the lake where bathymetric surveys have revealed the presence of several volcanogenic cones on the deep lake bottom. Again, scientific studies of sediment cores from Lake Kivu have revealed evidence of convective runaway events in the past. These appear to have been triggered by volcanic activity according to the evidence found in these cores (Ross, 2013a, b; Ross et al., 2014, 2015; Hecky and Reinthal, 2010). Lake Kivu is a rift-structured lake. It represents the beginnings of the formation of a possible new ocean. Lake Kivu sits within the western "Albertine" rift of the East African rift system. Its existence is directly associated with the most active volcanic province in Africa. Lake Kivu is bordered directly to the north by two active volcanoes, Nyiragongo and Nyamuragira. To the northeast is the Virunga chain of volcanoes, at least one of which has been active within the past 100 years. The area of the northern lakeshore is littered with volcanic cones as is the lakebottom in the northwestern sector. The periodic emplacement of rift-oriented vertical sheet-like dykes of magma under Lake Kivu is a generic expectation of its embryonic tectonic rifting situation. The tectonics of Lake Kivu combines aspects of continental rifting, new ocean crust formation and Iceland-like plume province interactions with rifting. In non-technical parlance, this is to say that volcanic activity on the lake bottom is to be expected in the future, continuing what is shown from the bathymetric record: that eruptive activity has been frequent over the past ~10,000 years.

By the end of 2014, only one small test power station was producing power from Lake Kivu deepwater gas on a scale ranging from 1 to 3 megawatts. This station utilizes a two-stage extraction & $CO_2$-removal gas cleaning process. The basic system design was a modification of engineering invented in the 1950s by Belgian scientists and engineers. The power output performance of this test station, "KP-1," was well below its design specification. The project suffered from long-term disputes including litigation as a consequence of the performance shortfall and other matters. The fraction of power consumption by gas extraction operations is not disclosed publicly but is widely expected to be substantial.

A stage of extensive research by experts and associated deliberation over extraction policies was finalized in 2009 with publication of Lake Kivu Management Prescriptions (LKMP, 2010) and an associated paper by Wuest et al., (2009): "Modeling the reinjection of deep-water after methane extraction in Lake Kivu." The deliberative process was thoroughgoing and well informed. It included an impressive quality and quantity of scientific data, insights and analyses (e.g., Tietze 2007, 1981, 1978; Schmid et al., 2003, 2005; Pasche et al., 2009; Wuest et al., 2009, 2012; Descy et al., 2012). However, it lacked understanding of the causes and chronology of lake convective events later illuminated by the research of Kelly Ann Ross and colleagues (Ross, 2013a, b; Ross et al., 2014, 2015). Despite the very high quality of input data and analysis, the conclusions made in the 2009 Management Prescriptions were, however, fraught with disagreement over unavoidable conflicts over conflicting agendas of long-term safety, process efficiency and ecological stewardship involving CO2. The most senior scientist involved disassociated himself from the final document, principally over concern for long-term human safety. This scientist's main concern was that $CO_2$ must be removed (co-degassed with methane) from the gas-rich deep layer rather than returned in large fraction in return flow reinjection into the deep lake. Technologically, degassing CO2 from the return flow was not in principle a difficult design change issue. Such a change, however, would vector Lake Kivu's massive CO2 reservoir to be vented to the atmosphere. Return of approximately 80% of the concentration of $CO_2$ into the deepwater was generic to the technology of the time.

In the perspective of hindsight, four significant aspects may be noted about the deliberations and disputes over the Lake Kivu Management Prescriptions and the associated technical advisory report of Wuest et al., (2009) concerning return flow reinjection scenarios and recommendations. First, the situation was pressured by significant commercialization agendas involving at least three different ventures, all seeking to implement variations upon the well-proven, Belgian technology inaugurated in the 1950, and all responding to a pressing need to produce electricity in the region such as was recognized and emphasized by all parties including the two host governments involved. Second, no new technology options were then in view such as would have been able to illuminate ways to overcome basic constraints of the old Belgian technology. Third, no understanding then existed on how potentially to utilize, rather than simply vent, degassed CO2 in very large amounts amounting to millions of tonnes per year. Fourth, no understanding then existed: (i) that past catastrophic degassings of Lake Kivu occurred; and (ii) that past degassing events appear not to have been spontaneous (that is, occurring when deepwater gas build-up reached a criticality point with respect to ordinary perturbations) but rather triggered by volcanic events.

The present day density structure of Lake Kivu is robustly stable against convective runaway (Kling et al., 1989; Wuest et al., 2009; Schmid et al., 2003, 2005, Lorke et al., 2004). There is no present day risk of a convective runaway arising spontaneously or as a consequence of ordinary perturbations such as, for example, sinking of a heavy object into gas-saturated sediments at 300 meters depth. Recent research findings based on sediment cores analysis from Lake Kivu, however, suggest there have been at least two large scale gas release runaway events occurring in Lake Kivu over the last 4,000 years (Ross, 2013a,b; Hecky and Reinthal, 2010). Both are associated directly in the sedimentology with evidence of initiating eruptive activity. The last event was approximately 900 years ago. A reasonable though not certain conclusion based on bathymetric evidence is that convective gas release events in Lake Kivu have been in the past, and in the future can be, triggered by sublacustrine volcanic events. Such events may be all-at-once runaways. Or they may extend over periods of time in local plume convection zone. A convective plume over an active volcanic sublacustrine eruption cone would pump local convective degassing. In certain conditions, this would not spread a self-sustaining convective front. It would limit degassing to the surface to a single plume zone of convection pumped from below by volcanogenic gas, pumice and heat energy release. Such point-like convective degassing would have the potential to degas fractions of Lake Kivu's deepwater gas reserve over various periods of time. Detailed multivariate computational modeling would be required to explore a range of estimates.

Sublacustrine volcanism differs from subaerial volcanism in that it does not involve associated sub-aerial degassing. Deep sublacustrine eruptions release significant gas flux upwards that is dissolved into the water into which it is released. In Lake Kivu, such conditions will increase dissolved CO2 levels locally above the gas input zone thereby approaching a condition of saturation and consequent formation of bubble-driven buoyant ascending plume dynamics. This is especially so for Lake Kivu because the local eruptive magma types are $CO_2$-rich. Sublacustrine events in Lake Kivu can involve rapid point-like release of possibly massive amounts of magmatically-derived $CO_2$ along with hot magma and biologically derivative gases accumulated in large quantities to bubble-forming saturation levels in deep sediments. Deepwater sublacustrine volcanism in Lake Kivu therefore can cause plume-like, sometimes explosive, fountaining of multi-phase plumes penetrating from the lake bottom to various depth levels in the lake, including above the lake's surface. Such events release massive amounts of heat, saturated bubble-forming gases, especially $CO_2$, bubble-rich heated muds, and rising columns of buoyant bubble-rich magmatic pumice. Analogs to such events are well known from oceanographic study of a variety of types of subsea volcanos. Were such a deepwater eruptive event to take place today in Lake Kivu, it is possible that it would nucleate runaway convection in the lake. Were this to happen, a large fraction of the lake's store of ~600 million tonnes of trapped $CO_2$ and ~50 million tonnes of trapped methane would be released catastrophically. A slower "plume-pumped" event extended over time also could be dangerous as well. It could generate an asphyxiating layer of CO2 locally. Apart from human safety matters, the loss of Lake Kivu's gas resource would be a gigantic economic catastrophe from the loss of its electric power potential and other substantial adjunct sources of value.

Satellite interferometric geophysical evidence is clear that the 2002 Nyiragongo eruption within the city of Goma through rift-oriented cracks was associated with deep rift-axial near-vertical faulting and magma dike emplacement extending for several kilometers under the lake in the northern sector (Wautier et al., 2012). This geophysical observation that perhaps only slight differences in the geodynamics of subsurface magma dyke emplacement in 2002 could have generated a sublacustrine eruption at depth in the range 450 to 300 meters. It is conceivable therefore that a convective runaway event could have been triggered at that time. Had that happened, the possible death toll from asphyxiation could have exceeded that of the entire Rwandan genocide of 1994.

The risk of such a future event can only be reduced substantially by two related processes. These are: (i) substantial reduction of $CH_4$ and $CO_2$ concentrations present in the MRZ, and (ii) deflation of the volume extent of the MRZ with consequent lowering of the depth position of its upper boundary known as the main density discontinuity (MDD). This discontinuity is presently located at about 260 meters depth. The MDD is slowly rising over time. This is due to natural inputs of $CO_2$-rich mineral waters from deep springs in the northern sector adjacent to the Nyiragongo volcanic field on land and its sublacustrine extension. Human action to reverse this process and deflate the MRZ by utilizing its resources is highly prudent. An accelerated timescale would be wise.

Because of its extraordinary beauty, it can seem reasonable to presume Lake Kivu to be a harmonious ecosystem. This would be an error. Lake Kivu is naturally unstable. It is subject to a slow irregular cyclic process producing occasional catastrophic events. This cycle involves slow build-up of dissolved gasses within a slowly inflating deep layer of dense water acting as a gas trap. Lake Kivu's dense deepwater comes from deep springs that release water rich in dissolved CO2 and in Na-, K-, Mg- and Ca-bicarbonates generated by volcanic-hydrothermal circulations with associated weathering of large volumes of young igneous rock. Fluxes of geogenic CO2 and biogenic CH4 become trapped in the deepwater layer over time. Extended phases of slow build-up of trapped gas end with catastrophic degassing. Sublacustrine volcanism of sufficient intensity will trigger runaway convection in circumstances whenever a sufficiently large layer of dense deepwater is present containing high enough levels of trapped gases to sustain large-scale convective dynamics once triggered. Otherwise a sublacustrine eruption may power convection during an extended period of plume-pumping above one or more sublacustrine sites of active volcanism.

Catastrophic lake mixing and degassing events cause local extinctions of oxygenic life both within the lake and on land peripherally within the Lake Kivu basin. These events are ecological catastrophes. They generate mass scale admixture of concentrated deep nutrients into surface waters. This creates eutrophication from algal megablooms and die-offs that cause bacterial de-oxygenation of the water column. Sediment core records show this clearly. Continuation of this natural cycle into the future conflicts with both human safety and ecological stewardship.

Lake Kivu's gas-rich deep layers have been accumulating gas for almost a thousand years to a presently dangerous level. An unavoidable conclusion from such considerations is that the most gas-rich gas-trapping deep layer should be substantially degassed. Carefully controlled artificial removal of the deep layer is a way to change and stabilize the natural process of repeated catastrophe. Such a removal process can both preserve the lake's ecosystem and provide a major driver for development.

Differences between the total mass of solutes in water and a density effect from their presence in solution are due to "haline contraction" effects (Monin, C., 1994; Appelo, 2014; Imboden and Wuest, 1995; Wuest et al., 1996; Millero, 2000; Boehrer and Schultze, 2008, 2009; Thierry et al., 2014; Schmid et al., 2003). For example, Lake Kivu MRZ deepwater contains total dissolved solids (TDS) of ~6 gTDS/l, whereas the in situ density effect contributed by these dissolved solids is ~⅔rds as large: ~4 g/l. Lake Kivu MRZ deepwater also contains up to almost 4 grams per liter of dissolved $CO_2$. However, this amount of dissolved CO2 in the MRZ contributes to an in situ excess water density of only ~1.1 gram per liter. Methane does not contribute excess density. In the MRZ of Lake Kivu it contributes a small negative density effect. PRZ water directly above the main discontinuity contains TDS at a level of roughly half of the MRZ amount: ~3 gTDS/l. The excess density effect in this water is (at ~⅔rds of the TDS): ~2 g/liter. The density discontinuity at ~260 meters depth a strong density contrast: ~2 g/l. This acts as a lid stabilizing and protecting the situation of Lake Kivu against upwards convention of the gas-rich dense deepwater. Therefore removal of CO2 from MRZ water leaves it too de-densified to be reinjectable into the MRZ and too dense to be reinjectable into the PRZ with preservation of horizontal layering stability.

Dissolved solids present in Lake Kivu represent potent and abundant bio-nutrients. The main component in terms of mass is bicarbonate ion, $HCO_3^-$. Bicarbonate ion represents on average roughly 4 grams per liter of TDS in MRZ water. This concentration of bicarbonate ion corresponds to ~0.8 grams of carbon per liter (~67 mM/l).

In Lake Kivu, the alkaline earths magnesium (Mg) and calcium (Ca), complex with bicarbonate and carbonate anions as doubly charged cations. These are present in MRZ deepwater at concentration levels of approximately 350 mg/l, (15 mM/l), and 150 mg/l, (3.7 mM/l), respectively. The alkali metals sodium (Na) and potassium (K), which also complex with bicarbonate and carbonate anions, but as singly charged cations, are present in MRZ deepwater at concentration levels of approximately 490 mg/l, (21.3 mM/l), and 320 mg/l, (8.18 mM/l), respectively (Tassi et al., 2009).

Bicarbonate is used by certain algal species, both prokaryotes and eukaryotes, as a main carbon source. Bicarbonate utilization systems in algae capable of bicarbonate utilization acts via a carbon concentrating mechanism (CCM) providing $CO_2$ to RuBisCO in the carbon-fixing photosynthetic process. This mechanism exhibits an overall chemical process formula $HCO_3^- \leftrightarrows CO_2 + OH^-$, (Azov, 1982; Shiraiwa et al. 1993; Talling, 2010; Chi et al., 2011; Chen et al. 2011; Giordano et al., 2005; van Hille et al., 2014). Carbon fixation from bicarbonate consequently causes a pH rise in the host solution. This is a widely observed and well-demonstrated natural phenomenon seen in many algal blooms as well as in laboratory tests (e.g., Talling, 1976, 1985, 2010; Wurts and Durborow, 1992; Eckert and Hambright, 1996; Uusitalo, 1996; Tucker and D'Abramo, 2008; Cerco et al., 2013; Keymer et al., 2014). pH-raising hydroxyl ($OH^-$) addition into solution corresponds directly on a mole-per-mole basis to photosynthetic carbon fixation into algal biomass.

Once degassed of CO2, the chemistry of Lake Kivu MRZ 375 m deepwater results is a Na—K—Mg-rich alkaline water with 4.2 grams per liter (69 mM/l) bicarbonate ion. The pH of this water when CO2-rich in situ at 375 meters depth is 6.15 (Tassi et al., 2009). When fully degassed, such water, when in equilibrium with atmospheric CO2 at sea level, will have pH ~10.1, according to the theoretical relation, pH=11.3+log(HCO3-), and empirical checkpoints of Wright, (1983) and Psenner and Catalan, (1994, see also Talling, 2010), where the bicarbonate ion concentration is input in units of moles per liter. A higher pH can be reached by further CO2 removal beyond that which corresponds to equilibrium with atmospheric CO2.

In the carbonate system in fresh water, bicarbonate ion is the dominant carbon-carrying molecule at this pH in Lake Kivu (Tassi et al., 2009; Mook. 2000): ~97% $HCO_3^-$ and ~3% $CO_3^{2-}$. The most abundant bicarbonate-complexing cation in Lake Kivu deepwater is magnesium: 0.38 g/l (15.6 mM/l) at 375 meters depth (Tassi et al., 2009). Of the total 4.2 gTDS/l bicarbonate component in 375 m deepwater, the $Mg^{2+}$-complexed bicarbonate component is 2.3 TDSg/l or 55%, whereas the $Ca^{2+}$-complexed bicarbonate component is 0.5 TDSg/l or 12%. Additional bionutrients present in Lake Kivu MRZ deepwater (Tassi et al., 2009) include the basic "NPK" bionutrients: ammonium ion ($NH_4^+$: 55 mg/l, 3.2 mM bio-available Nil), phosphorus (P: ~5 mg/l, 0.16 mM/l) and potassium (K: ~320 mg/l, ~8.2 mM/l), as well as silicon (Si) and sulphur (S), plus other trace biologically significant trace elements such as Fe, Zn, Se and Mo.

pH-dependent magnesium hydroxide precipitation is well known to provide a basis for autoflocculation of algal biocultures when sufficient magnesium is present in bioculture solutions (Golueke and Oswald, 1965; Elmaleh et al., 1991; Tesson et al., 2008; Spilling et al. 2010; Vandamme et al., 2012, 2013, 2014, 2015; Vandamme, 2013; Wu et al., 2012; Smith and Davis, 2012; Gonzalez-Fernandez and Ballesteros 2012; Besson and Giraud, 2014, Garcia-Perez et al., 2014; Baya et al., 2014; Choi, 2014). Magnesium concentrations of 5, 10 and 15 mM/l have been demonstrated to be highly effective for flocculation (Garcia-Perez et al., 2014). In the experiments of Garcia-Perez et al., (2014), using an Mg concentration of 15 mM/l, flocculation efficiency is 98% effective at pH 10.5 with 18% of Mg precipitated, whereas 97% percent of Mg is precipitated by pH 11.0. Based upon other observations, Mg would be expected begin to precipitate at about pH 9.7 in extracted Lake Kivu deepwater obtained at 375 meters depth (O'Connor et al., 2009; Langmuir, 1997; Abrams et al., 1999). By pH 10.4, Mg solubility would have decreased to ~20 mg/l such that, 95% of the originally present Mg in solution will have precipitated. These data sets differ. In general, trace levels of CO2 in solution are likely to influence all experimental results. Also in carbonate-dominated chemistries, varying CO2 levels in solution will govern varying pH and varying degrees of magnesium hydroxide precipitation. Lake Kivu deepwater that is extracted and degassed covers a huge range in CO2 content in such a process, beginning with up to almost 4 grams CO2 per liter dissolved in solution. The dissolved CO2 amount controls the pH in this water type (Ying et al., 2014). Calcium has lower solubility than magnesium and is observed to co-precipitate with magnesium hydroxide in cases of rising pH precipitating large quantities of magnesium hydroxide, for example in flocculation processes (Vandamme, 2013).

Efficient techniques have been developed for surface skimming of flocculated algae that has been separated to the surface of bioculture by microbubbles attachment. Microbubble supply may be by conventional Dissolved Air Floatation (DAF) methods (Aulenbach et al., 2010), or by methods utilizing new fluidic oscillation technologies for microbubble production (Zimmerman, 2011; Zimmerman et al. 2011; Hanotu et al., 2012, 2013). DAF separations are a long-established industrial technology.

Wet magnesium hydroxide with admixed calcium carbonate is an input material in the production of $H_2O$— and $CO_2$-absorbing "greentech" cements and precast pozzolanic concretes and related building materials such as wall and paving bricks, cinder blocks, roof tiles and reinforced columns and beams (Harrison, J: TecEco website; Vandperre and Al-Tabbaa, 2007; Liska and Al-Tabbaa, 2007, 2008, 2009; Liska et al., 2008; Unluer and Al-Tabbaa, 2013a,b, 2014a,b).

Algal biocultures operated in high pH alkaline situations offer special advantages for "greentech" algal-bacterial biomass production operations. They allow efficient, low waste, input of $CO_2$ into open air or otherwise non-sealed biocultures (Chi et al., 2011, 2013, 2014). A first advantage is that $CO_2$ can be injected for "CO2 loading," that is to reduce carbonate ion concentrations by recharging bicarbonate concentrations. In the high pH range, $CO_2$ absorbs readily into solution in the net of gas exchange with the atmosphere. A second advantage of pH-swing recharge cycle is that it can be used to balance diurnal (diel: day/night) cyclicality in photosynthetic carbon fixation. Photosynthesis can boost pH during the day by carbon biofixation. When photosynthesis is not active during the night, continued $CO_2$ addition can be absorbed by chemical absorption into solution, decreasing carbonate ion abundance and increasing bicarbonate ion abundance.

Previous disclosed teachings help to understand: (i) how nutrient-rich deepwater can be to grow marine diatoms used in aquaculture (1983: U.S. Pat. No. 4,394,846); (ii) how water produced from drilled wells can be can be treated to remove pollutants (2009: EP 2 093 197 B1); (iii) how wastewater can be reclaimed by algal production (1973: U.S. Pat. No. 3,780,471; 2012: U.S. Pat. No. 8,101,080 B2); (iv) how bicarbonate can be an important aspect of high-yield lipid production in algal bioculture production (2013: US 2013/0295623 A1); (v) how algal increase in pH by protosynthesis effects changes in carbonate-bicarbonate equilibria that allow efficient diurnal $CO_2$ capture into algal production systems (2013: US 2013/0319059); (vi) how potassium can be recovered from waste waters by algae (2012: US 2012/0061315 A1). There are long-established teachings on mass algal culture using waste water (for example: 1965: 3,195,271). There also are recent disclosed teachings on algal bioculturing in batch mode in photobioreactor (for example: US 2010/0112649 A1). Also there are recent teachings on treatment of produced waters from fracking operations (for example: US 2014/0076817 A1, and US2012/0175308 A1). (For a recent review on treatment of produced water, see: Duraisamy et al., 2013.) While various of these teachings provide helpful insight related in various ways to the specific method disclosed herein, none provide specific insight for addressing the specific chemistry, challenges, constraints and opportunities of Lake Kivu.

Accordingly, there is a pressing need and substantial opportunity for a new method and system to extract Lake Kivu deepwater in a way that degasses CO2, ensures lake safety over time, utilizes resources other than methane, produces products other than electric power, accesses methane otherwise untapped by conventional technologies, couples degassing with hyper-efficient oxyfuel combustion turbine and CO2 power cycle technology, and couples CO2 degassing into various possibilities of CO2 utilization.

All references cited herein are incorporated herein by reference in their entireties.

BRIEF SUMMARY OF THE INVENTION

A first aspect of the invention is a method for treating water extracted from Lake Kivu, said method comprising the steps of:

(a) extracting water from an extraction depth of Lake Kivu to obtain extracted water;

(b) degassing the extracted water so as to remove at least a portion of carbon dioxide gas from the extracted water and provide degassed water having a density lower than the extracted water and having a pH higher than the extracted water;

(c) photosynthetic treatment of the degassed water by growth of an algal biomass to convert bicarbonate anions to carbon dioxide and hydroxyl anions, such that the pH of the degassed water is increased and magnesium and calcium precipitate out of the degassed water to provide de-densified water and precipitate;

(d) separating the de-densified water from the algal biomass and the precipitate;

(e) optionally adjusting the pH of the de-densified water by adding carbon dioxide thereto, wherein the carbon dioxide is obtained from the degassing step and by combustion of methane also obtained in the degassing step; and (f) reinjecting into Lake Kivu a return flow of the de-densified water separated from the biomass and precipitate, wherein the de-densified water is reinjected into Lake Kivu at a reinjection depth which is shallower than the extraction depth and which is density matched with the de-densified water.

In certain embodiments of the inventive method (i) the portion of carbon dioxide gas removed from the extracted water in the degassing step is selected to control the pH of the water and thereby to control degrees of magnesium and calcium precipitation; and (ii) magnesium and calcium precipitates formed in the degassing step are separated from the degassed water.

In certain embodiments of the inventive method, the extraction depth is at least within a main resource zone presently located more than about 260 meters below a surface of Lake Kivu and the reinjection depth is no deeper than 250 or 200 or 150 meters below the surface of Lake Kivu.

In certain embodiments of the inventive method the extracting step comprises extracting water from a plurality of different extraction depths, each of which is deeper than the reinjection depth.

In certain embodiments of the inventive method, the degassing step comprises: (i) extracting dissolved methane from the extracted water at a first pressure where the carbon dioxide remains preferentially in solution; and subsequently (ii) extracting the carbon dioxide from the extracted water at a second pressure less than the first pressure.

In certain embodiments of the inventive method, the degassing step comprises removing substantially all of the carbon dioxide gas from the extracted water.

In certain embodiments of the inventive method, the degassing step comprises removing less than substantially all of the carbon dioxide gas from the extracted water and subsequently conducting the photosynthesis step at a pH lower than with total degassing of carbon dioxide.

In certain embodiments of the inventive method, the photosynthesis step is conducted in at least two stages: (i) a first stage conducted with a first algae that raises the pH of the degassed water but does not precipitate most of the magnesium and calcium; and (ii) a second stage conducted with a second algae that consumes bicarbonate ions from the degassed water so as to facilitate full precipitation of magnesium and calcium therefrom, wherein the first and second stages are conducted in any order or simultaneously.

In certain embodiments of the inventive method, the method promotes natural trophic stages which ultimately cultivate the growth of organisms that contain docosahexaenoic acid and/or eicosapentaenoic acid for harvesting.

In certain embodiments of the inventive method, the method is staged to produce at least one crop of alkaline system algae and associated biomass.

A second aspect of the invention is a system for treating water extracted from Lake Kivu, said system comprising:

(a) a water degassing system configured to extract water from an extraction depth of Lake Kivu to obtain extracted water and degas the extracted water so as to remove at least a portion of carbon dioxide gas therefrom and provide degassed water;

(b) a water treatment system configured to: (i) photosynthetically treat the degassed water in a biomass containing algae to convert bicarbonate anions to carbon dioxide and hydroxyl anions, such that a pH of the degassed water is increased and magnesium and calcium precipitate out of the degassed water to provide de-densified water and precipitate; (ii) separate the de-densified water from the biomass and the precipitate; and optionally (iii) adjust the pH of the de-densified water by adding carbon dioxide thereto, wherein the carbon dioxide is obtained from the degassing step and by combustion of methane also obtained in the degassing step; and (c) a return flow system configured to reinject into Lake Kivu a return flow of the de-densified water separated from the biomass and precipitate, wherein the de-densified water is reinjected into Lake Kivu at a reinjection depth which is shallower than the extraction depth and which is density-matched with the de-densified water.

In certain embodiments of the inventive system, the water degassing system comprises:

an intake pipe system;

at least one bubble capture unit positioned upwards along a system of degassing pipes;

at least one degassing catalyst unit positioned further upwards along the system of degassing pipes;

a bubbly flow turbine configured to capture and recycle power from jetting foam flow at a top of the system of degassing pipes, wherein the bubbly flow turbine is also configured to function as a foam separator;

at least one vacuum degassing unit positioned at the top of the system of degassing pipes; and a water flow turbine capturing and recycling power in a downward outflow of degassed water from the at least one vacuum degassing unit.

In certain embodiments of the inventive system, the return flow system comprises:

an outflow pipe from the water degassing system;

pipe systems connecting flow to the water treatment system;

a return flow pipe system and horizontal diffuser to reinject degassed water into Lake Kivu at a specified depth; and flow control valve systems with emergency shut-off capabilities.

In certain embodiments of the inventive system, the water treatment system is further configured to: (i) control the portion of carbon dioxide gas removed from the extracted water in the degassing step to control the pH of the extracted water and thereby to control degrees of magnesium and calcium precipitation; and (ii) separate from the degassed water and recover magnesium and calcium precipitates formed in the degassing step.

BRIEF DESCRIPTION OF SEVERAL VIEWS OF THE DRAWINGS

The invention will be described in conjunction with the following drawings in which like reference numerals designate like elements and wherein.

TABLE 1

Removable dissolved solids from 375 m depth Lake Kivu deepwater (Data from Tassi et al., 2009)

| Depth (M) | Substance | mg/l | milli Mol./l (mM/l) | Notes (removal) | Removable TDS (gTDS/l) |
|---|---|---|---|---|---|
| 375 | Total TDS | 5687 | — | | |
| 375 | All $HCO3^-$ | 4198 | 68.8 | | |
| 375 | $Mg^{++}$ | 380 | 15.6 | 100% | 0.380 |
| 375 | $Ca^{++}$ | 130 | 3.2 | 100% | 0.130 |
| 375 | $Na^+$ | 488 | 21.2 | 0% | 0 |
| 375 | $K^+$ | 320 | 8.2 | 0% | 0 |
| | | | | | (Sum: 0.510) |
| 375 | $HCO3^-$ (Mg) | 1903 | 31.2 | 100% | 1.903 |
| 375 | $HCO3^-$ (Ca) | 390 | 6.4 | 100% | 0.390 |
| 375 | $HCO3^-$ (Na) | 1294 | 21.2 | 0% | 0 |
| 375 | $HCO3^-$ (K) | 500 | 8.2 | 0% | 0 |
| 375 | $HCO3^-$ (NH4+)? | ? 195 ? | ? 3.2 ? | ? 100% ? | ? 0.195 ? |
| | | | | | (Sum: 2.488) |
| 375 | $SiO2$ | 105 | 1.75 | 100% | 0.105 |
| 375 | $NH4^+$ | 55 | 3.2 | 100% | 0.055 |
| 375 | $SO4^{--}$ | 15 | 0.156 | 100% | 0.015 |
| 375 | $S^{--}$ | 7.2 | 0.224 | 100% | 0.007 |
| 375 | P | 6.7 | 0.216 | 100% | 0.007 |
| 375 | $Sr^{++}$ | 5 | 0.061 | 100% | 0.005 |
| 375 | $Cl^-$ | 97 | 2.74 | 0% | 0 |
| 375 | $F^-$ | 3.3 | 0.176 | 0% | 0 |
| | | | | | (Sum: 0.194) |
| | | | | | (Sum: 3.192) |

NOTES:
Bicarbonate accounting associated with ammonium anion is uncertain.
Bicarbonate associated with measured Mg, Ca, Na and K sums to 4.087 gTDS/l.
Bicarbonate associated with these cations plus NH4+ sums to 4.288 gTDS/l.
Measured bicarbonate reported in the Table 1 of Tassi et al., (2009) is 4.198 gTDS/l.
Silicon accounting is as reported rather than for (heavier) silicic acid.

Figure 4:
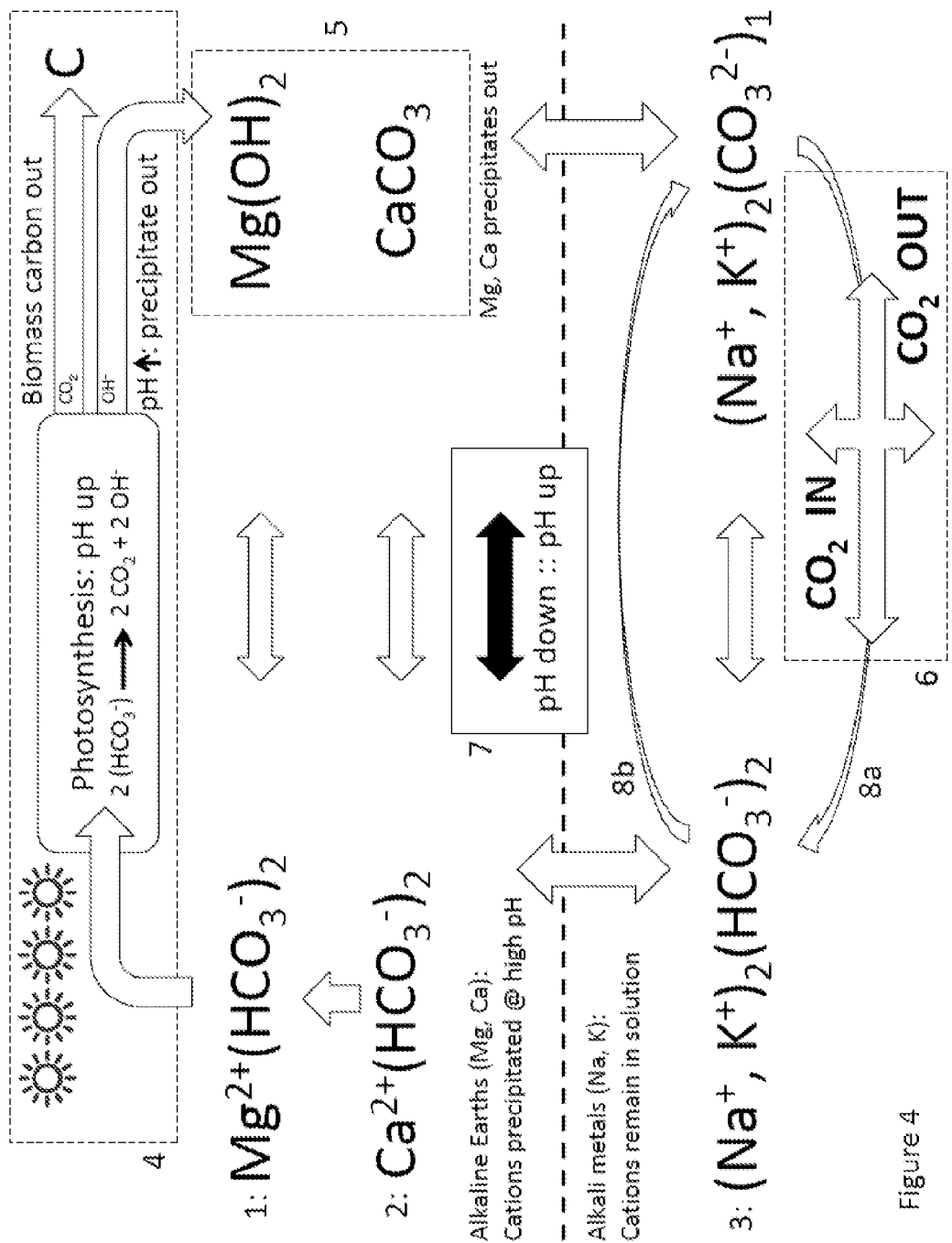

FIG. 4 is a schematic representation of basic chemical aspects of Lake Kivu deepwater in the context of the Water Treatment System (WTS).

Figure 5:
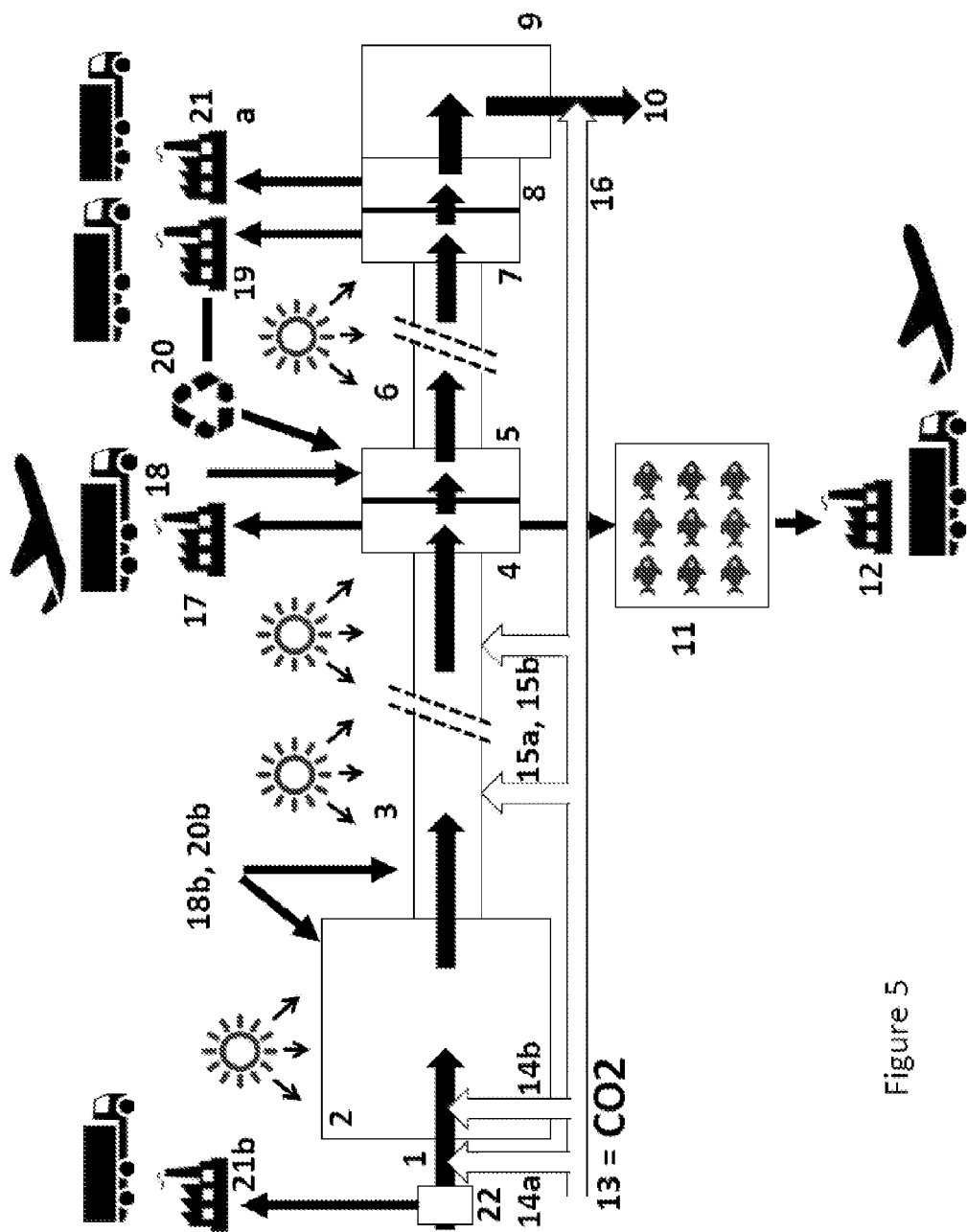

FIG. 5 is a schematic representation mostly in rough horizontal plan view providing detail on a number of preferred embodiments of the return flow Water Treatment System (WTS) and associated production and product transport associated activities shown as icon representations.

DETAILED DESCRIPTION OF PREFERRED EMBODIMENTS OF THE INVENTION

The invention is based on inventive insight into how significant problems in Lake Kivu deepwater utilization may be solved by: (i) total degassing to remove both CH4 and (most) CO2 from the flow of extracted water, followed by; (ii) de-densifying water treatment of the flow to produce valuable products as a means of de-densification, followed by; (iii) reinjection of the de-densified return flow above the Potential Resource Zone (PRZ) and into the Intermediate Zone (IZ) at or above 150 meters depth. Doing so solves significant problems. It also accomplishes useful production from deepwater resources that are not utilized by the standard technologies that have been practiced on Lake Kivu.

The inventive method and system substantially increases the extractable methane resource by reinjecting de-densified water on top of Lake Kivu's stack of gas-bearing water layers (which increase in density downwards), thereby "pushing" the lake's gas reserves downwards from above while the deepest layer simultaneously is being evacuated via the extractive degassing process by one or more deep pipes. The core of the invention is a method and system for reducing the density of return flow water by extraction of substances that cause its excess density, thereby allowing reinjection of return flow water above the dense, methane-containing, resource layers, rather than within them. This avoids dilution, optimizes lake safety, and expands the accessible methane resource. The water treatment process includes production of algal biomass and extraction of magnesium hydroxide and calcium carbonate. The invention couples and integrates a "total" degassing technology together with a return flow management solution for water that has been degassed. This allows an increase in power production efficiency via oxyfuel combustion (which does not require separation of CO2 from methane for efficient power generation). The overall method and system in combination with the method and system disclosed in US 2015/0354451 facilitates up to 300% improved power production from Lake Kivu's deepwater gas reserve, while simultaneously creating valuable co-products having a potential value exceeding the value of electric power from methane alone.

Figure 1:
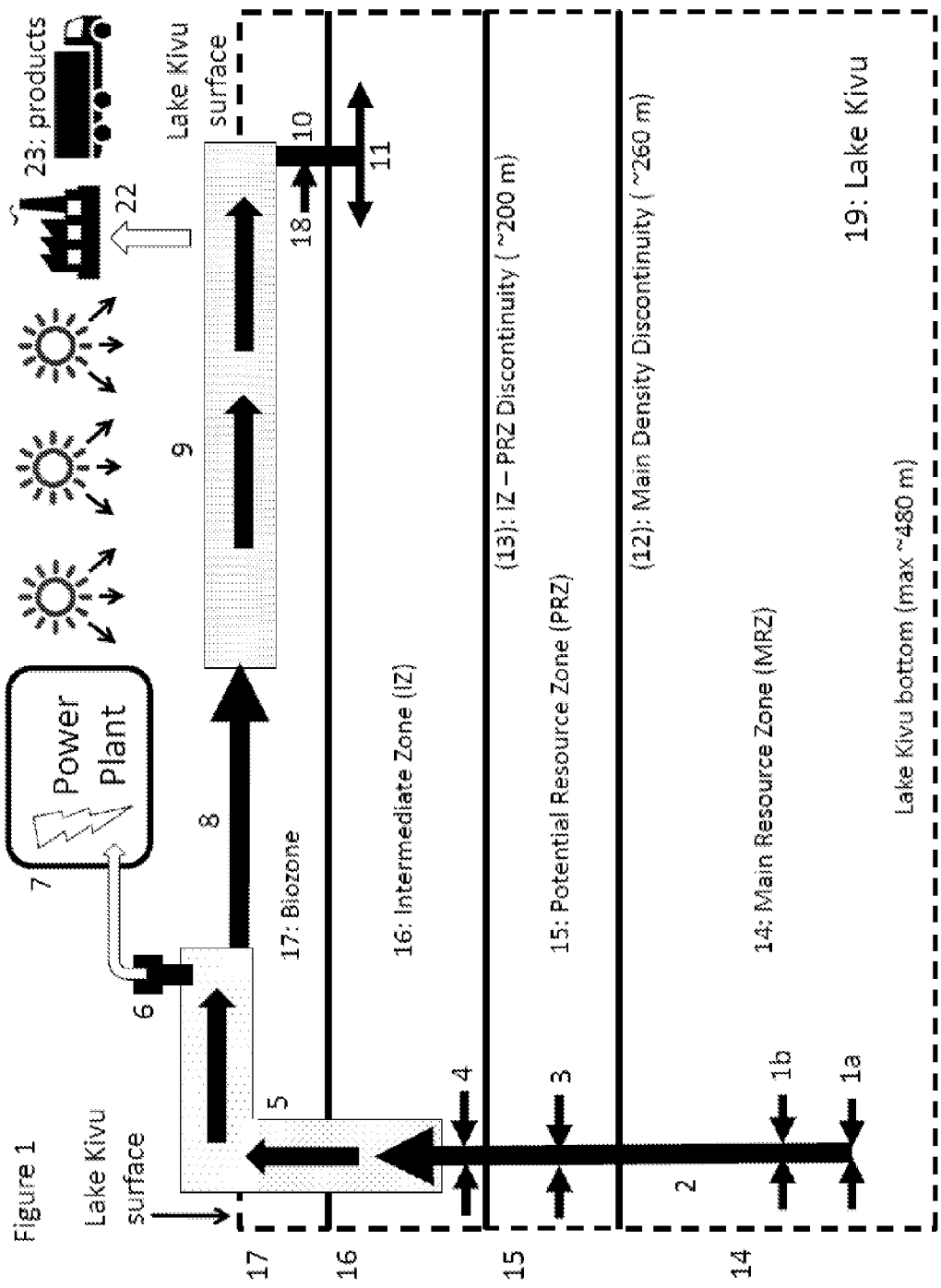
FIG. 1 is a schematic system overview of the integrated extraction (1, 2, 3, 4), degassing (5, 6), transfer (8), de-densification (9), and reinjection (11) method and system of return flow water transfer, treatment and reinjection into Lake Kivu shown in vertical perspective with its density structure indicated.

FIG. 1 illustrates that the total degassing stage is by the sub-system and/or sub-method of a Total Degassing System (TDS). Lake Kivu's (19) zones and separating density discontinuities are shown labeled as items 12, 13, 14, 15, 16 and 17. A modality of TDS is shown in FIG. 1. It is shown comprised of items 1, 2, 5 and 6, plus, optionally, items 3 and 4 additionally as preferred embodiments which may be implemented if and as desired. (These optional items are extraction ports for deepwater extractive intake from the PRZ and IZ.) A form of TDS modality also is shown enclosed within box 1 in FIG. 2. Details of a particularly efficient TDS modality are disclosed by the inventor within US 2015/0354451, "Method for safe, efficient, economically productive, environmentally responsible, extraction and utilization of dissolved gases in deep waters of a lake susceptible to limnic eruptions, in which methane is accompanied by abundant carbon dioxide." A TDS may be implemented by many modalities of methods and systems, even that of a simple auto-siphoned upflow to the surface or near surface, by modification of existing technologies practiced on Lake Kivu.

Such a modification is a preferred embodiment. It is constructed to degas CO2 from the deepwater return flow rather than to reinject it into the deep lake as CO2-rich deepwater after degassing methane at shallow depth such as, typically, 20 meters. This modality of modification is a simple in respect to design. It is a matter of re-directing return flow after degassing at depth to the near surface such as by auto-siphoning ascending flow, or any similar method employing pressure release to degas dissolved CO2 separately and following the degassing of gas obtained by degassing under pressure at depth in order preferentially to degas methane over CO2.

Figure 2:
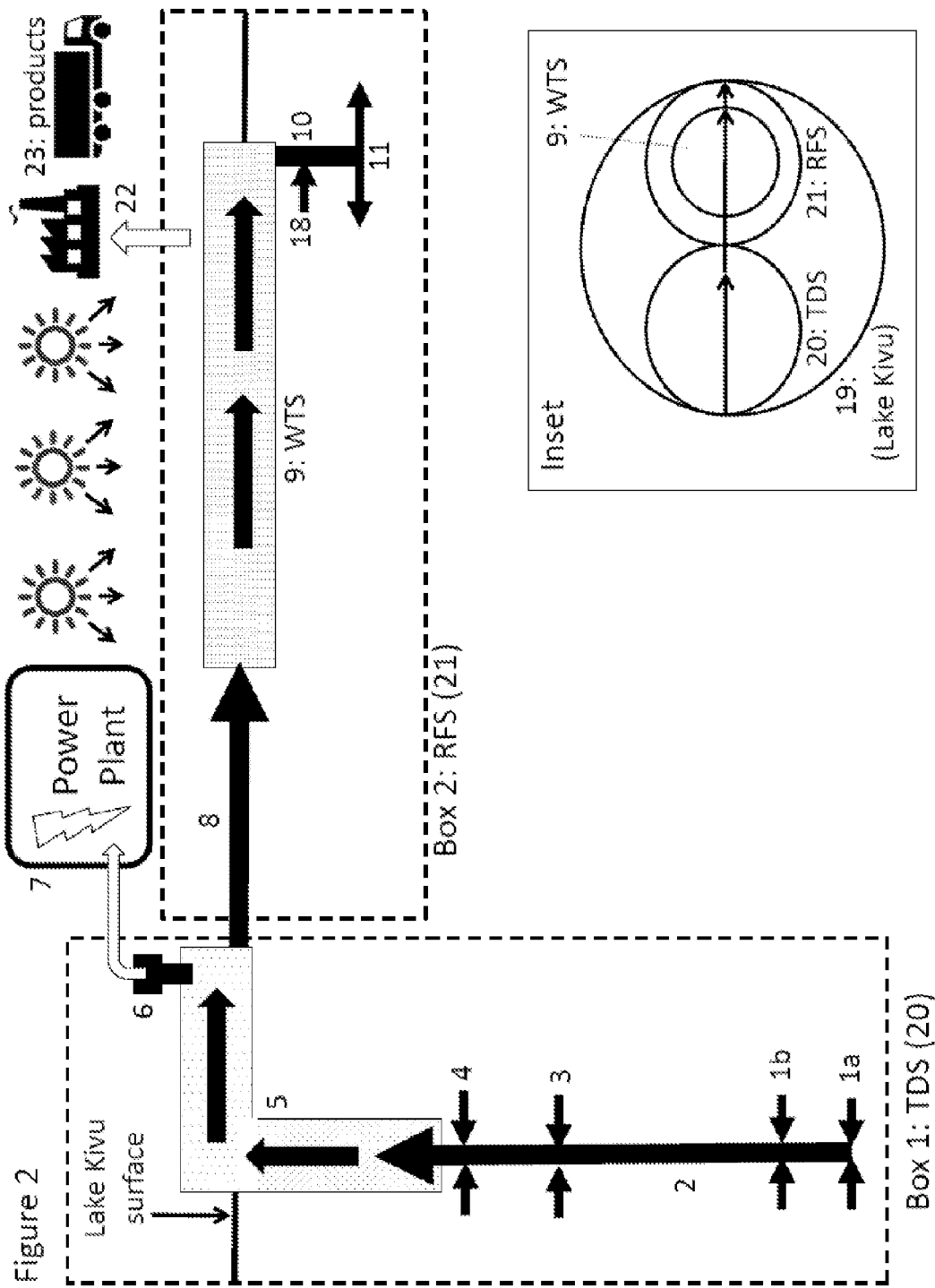
FIG. 2 is a schematic system overview detailed in terms of the specific combination of sub-methods and sub-systems (contained within boxes 1 and 2) included together in the invention, and also the technology components excluded (especially numbered item 7). Numbered items are identical to those shown in FIG. 1.

The modality of US 2015/0354451 includes application of a vacuum pumping sub-method and sub-system that provides extracted gas to a power plant (item 7 in FIGS. 1 and 2). The aspect of vacuum-assisted gas extraction is represented as item 6 in FIGS. 1 and 2 in the present disclosure. It is a preferred embodiment herein. The water treatment stage is by the system and/or method of a Water Treatment System (WTS) disclosed herein, and illustrated in FIG. 1 (item 9), 2 (item 9), and additionally in detail for various preferred embodiments represented schematically in FIG. 5. Transfer of degassed water from the TDS stage to the WTS stage is by pipe systems and methods as shown in FIGS. 1 and 2 by item 8 as labeled in both figures). The WTS is part of a Return Flow System (RFS) comprised of the combination of items 8, 9, 10, and 11 as shown in FIGS. 1 and 2, and as enclosed within box 2 in FIG. 2. Item 10 is a downgoing pipe system for return flow reinjection with a small inflow arrow shown (18) which is a preferred embodiment and may or may not be included. This (18) represents a sub-method and sub-system for admixing relatively low-density water from the biozone (17) into the return flow, if and as needed, to reduce its density prior to reinjection in order to reach specified target densities appropriate to horizontal reinjection (11) of the return flow in a stable density-matched condition. A factory is shown by an icon (22). It produces products (23).

FIG. 2 illustrates the overall method and system as the integrative combination of a TDS (20) with a RFS (21) containing a WTS (9), showing the components within Box 1 (TDS) and Box 2 (RFS containing a WTS: item 9, and in the inset). Resource-rich deepwater is extracted from the Main Resource Zone (14) by one or more extraction ports (1a, b) into one or more pipe-like riser structures (2) leading upwards into one or more degassing systems (5). A TDS (20) may be staged as described in US 2015/0354451 in preferred embodiments. Additional resource bearing deepwater may be co-extracted through additional extraction ports (3, 4) from higher-level zones in the lake such as the PRZ (15) and the IZ (16), if desired and in amounts as desired. The schematic nature of the representation shows a single extraction unit with a single pipe system. There may be one or two or many such units in some embodiments. Deepwater extraction proceeds via one or more large pipe-like structures (2), represented by a vertical arrow in FIG. 2. In some embodiments, pipe-like extraction systems may be vertical or not vertical or linear or not linear in shape. The diagram shows deepwater intake from one of more intake ports (1, 3, 4) within the Main Resource Zone (MRZ), the Potential Resource Zone (PRZ), and the lower Intermediate Zone (as indicated in FIG. 1). Item 5 is a total degassing unit shown schematically with both ascending and transverse geometries. It is a preferred embodiment amongst others such as a modification to existing practical technologies according to the modification schema noted herein. Item 6 is a schematic representation of gas removal involving gas extraction pumps which deliver gas into a power plant (7). This power plant has the capability to combust Lake Kivu gas degassed with extremely high associated and unremoved CO2. However, a power plant does not form a part of certain embodiments of the invention, as shown in FIG. 2 where components of the invention are in boxes 1 and 2. The combination of items 1 through 7 is disclosed and claimed in U.S. 2015/0354451. Item (8) represents the flow of degassed deepwater as it is piped to next stages of water treatment (9) involving bio-utilization and other capture process for removal of substances responsible for excess density. Items (10) and (11) show return flow into the lake, in this case into the upper IZ. Reinjected water may or may not include admixing of water from the biozone (12). FIG. 2 illustrates the two integrated component aspects of the invention, a TDS (enclosed within Box 1) connecting (8) to, and organizing flow into, a RFS (enclosed within Box 2), as shown also in the inset.

FIGS. 1 and 2 together show also how the invention allows, by means of de-densification, dense deepwater obtained at depth to be processed in a WTS within a RFS, for reinjection into Lake Kivu's density-stratified stack of horizontal layers, above the PRZ, and within the IZ. These illustrating figures indicate the basis wherewith the volume and vertical extent of MRZ can be deflated over time without disturbance of the stability of the main density discontinuity (12), and also without disturbance to the stability of the higher-up density discontinuity separating the PRZ and the IZ (13). Operation of such a system over time will lower the level of both major density discontinuities. Operation of such a system over time will allow gas extraction from the PRZ. It also can allow gas extraction from part of the IZ in preferred embodiments, if and as desired.

Figure 3:
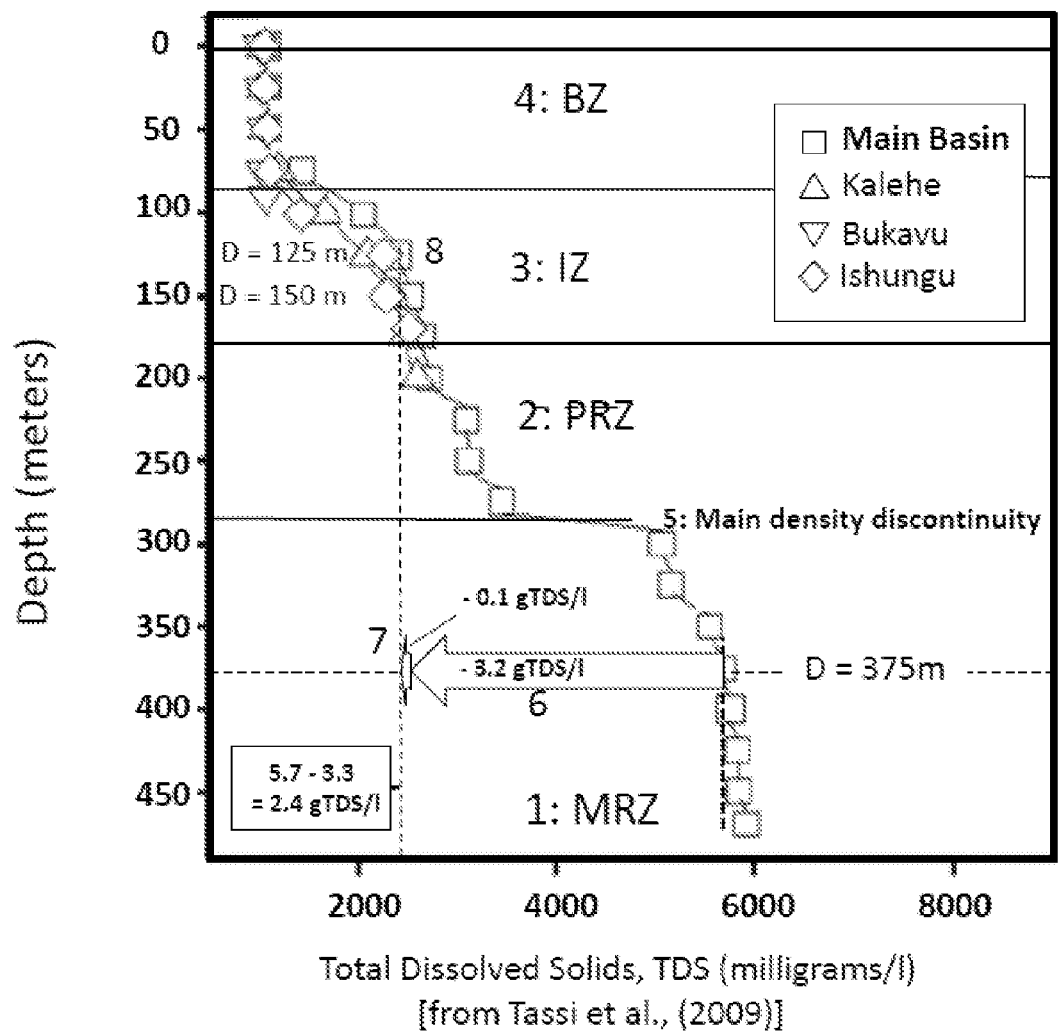
FIG. 3 is a graph of the Total Dissolved Solids (TDS on the x-axis) component contributing to the vertical density structure (y-axis) of Lake Kivu. This density structure is shown with its defined methane resource zones (MRZ, PRZ) and upper zones (IZ and Biozone). Two horizontal vectors, labeled 6 and 7, are shown. The sum of these indicates the scale of TDS removal possible for de-densification of MRZ deepwater by the method and system disclosed herein. Modified from Tassi et al., (2009). See Table 1 for the data used.

FIG. 3 illustrates the de-densification agenda contextualized on a basis of TDS concentrations and Lake Kivu's composition and water density layering. The general agenda is to de-densify deepwater so that it can be reinjected by the RFS after WTS water treatment at the most minimal depth possible within the Intermediate Zone (IZ). The scale of achievable de-densification is shown as a sum of two vector arrows (labeled 1 and 2). The first vector arrow (1) represents a removal of dissolved solids and is representable straightforwardly, scale-matched, on the x-axis TDS scale. Data is from Table 1 using the measurements of Tassi et al., (2009). The second vector arrow (2) represents an effective TDS removal accountable from the de-densifying effect of the total degassing of CO2 and CH4 in the TDS.

The process of total degassing causes substantial de-densification of Lake Kivu deepwater. Formulii and input factor values for calculating the effect are provided by Schmid et al., (2003). These specify density variation effects of x(−0.284)(MCO2) for de-densification factored by the mass of CO2 degassed per liter, and an opposite sign effect of x(1.25)(MCH4) for densification factored by the mass of CH4 degassed per liter, MCO2. According to these calculii, carbon dioxide degassing decreases water density by ~28% of the CO2 mass contribution degassed. Methane degassing increases the water density of the water it was degassed from by ~125% of the CH4 mass contribution, MCH4. For deepwater sources at 375 meters depth, with 3.7 g CO2/l and 0.26 g CH4/l, (Schmid et al., 2003), the density effect of total removal of both CO2 and CH4 is: −1.04 g/l+0.32 g/l=−0.72 g/l change in density. (That is, de-densification by 0.72 g/l in the sum of the effect of degassing both gases completely).

FIG. 4 illustrates in simplified form the pH-variable system of carbonate equilibrium (1, 2, 3) operating in Lake Kivu's Mg(Na)-bicarbonate water as is applicable for understanding water treatment processes after degassing most of the dissolved CO2. The alkali metals, Na and K, (3), remain in solution. They function in a "CO2 pump" aspect (6, 8a,b) that become dominant as most of the Mg (1) and Ca (2) is precipitated (5). Precipitation (5) of Mg (1) and Ca (2) is pH dependent. pH and precipitation is controlled by the amount of CO2 in solution and by photosynthetic uptake of HCO3−, (4), yielding one hydroxyl ion (OH−) per carbon atom photosynthetically taken up into biomass. For Lake Kivu's Mg-rich deepwater composition (see Table 1 for 375 meters, and Tassi et al., (2009), Mg and Ca can be precipitated to a high fraction of the amount present by removal of CO2. Control on precipitation for avoidance or for separation is provided by the operation of a TDS, especially via a vacuum pumping capacity, such that Mg and Ca may be precipitated by a CO2-controlled non-biologic process if and as desired, in a precipitator and slurry separator at the beginning of the WTS as shown by item 1 in FIG. 5. However, if bio-utilization of dissolved CO2, Mg and Ca is preferred for productive bio-operations in the WTS, then dissolved CO2 can be modulated to suppress Mg and Ca precipitation. Or sequential processes can be operated with CO2 removal followed by re-dissolution if and as desired in order to optimize various outputs.

Water treatment following degassing is mostly (but not necessarily only) via a bioprocess of algal biomass growth. This bioprocess may be of a variety of types. In a preferred embodiment it is staged with more than one stage and more than one point of biomass harvesting. The general method and system is a process that utilizes both CO2 degassing and photosynthesis to increase bioculture pH leading eventually to precipitation of magnesium hydroxide and calcium carbonate with consequent de-densification. This is a core inventive insight of the invention. Basic aspects of the system of chemistry with CO2 control and photosynthetic control are shown in FIG. 4.

Photosynthetic growth of certain algal species incorporates carbon from bicarbonate ion such as is abundant in Lake Kivu's Mg- and Na-rich deepwater. The bicarbonate anion concentration, $HCO_3^-$, in Lake Kivu is: ~4 g/l in the MRZ. It is ~1.5 g/l at 100 meters at the top of the IZ (Tassi et al., 2009). Photosynthesis utilizes Dissolved Inorganic Carbon (DIC) obtained from the deepwater's abundant supply of dissolved bicarbonate ($HCO_3^-$) anion. Return flow water begins to be de-densified of TDS components as pH approaches and exceeds pH ~10 when magnesium hydroxide, $Mg^{2+}(OH^-)_2$ precipitation begins if kept isolated from a carbonating external CO2 source. The increase of pH from pH 9 to pH 10 and beyond causes the chemistry of dissolved bicarbonates, $Na^+HCO_3^-$, $K^+HCO_3^-$, $Mg^{2+}(HCO_3^-)_2$, $Ca^{2+}(HCO_3^-)_2$, to be transformed increasingly from a singly charged bicarbonate anion dominated chemistry into a chemistry dominated by doubly charged carbonate anions ($CO_3^{2-}$): $(Na_2)^{2+}CO_3^{2-}$, $(K_2)^{2+}CO_3^{2-}$, $Mg^{2+}CO_3^{2-}$, $Ca^{2+}CO_3^{2-}$, plus $Mg^{2+}(OH^-)_2$ responding to the increase of hydroxyl ion, $OH^-$, from 0.01 mM/l at pH 9 to 0.1 mM/l at pH 10 towards 1.0 mM/l if pH 11 is reached. This pH-factored carbonate transition chemistry and its salinity dependence may be seen in Bjerrum plots in many published sources such as Stum and Moragan, (1971), Butler, (1991), Mook, (2000), Zeebe and Wolf-Gladrow (2001), and Wolf-Gladrow et al., (2007).

Note that this transformation does not conserve the amount of carbon in solution but rather corresponds to photosynthetic removal of carbon into algal biomass. The amount of bicarbonate ion removed from solution by this photosynthetic C-removing bicarbonate-to-carbonate transformation of ion composition in solution is very roughly about half of the total of bicarbonate ion component of the total TDS, or ~0.5×~4 gTDS/l~2 gTDS/l. The effect of this change in TDS upon the actual density of the solution depends upon whether the cations are precipitated as pH increases. The alkali metal cations (Na, K) remain in solution as carbonates. The alkaline earths (Mg, Ca) do not. They are precipitated.

Density effects for bicarbonate and carbonate anions in aqueous solution differ very considerably (Wuest et al., 1996; Rodriguez and Millero, 2013). Specific density effects for mixed solutes can be obtained computationally using programs developed for seawater and geochemical fluids calculations. However, it is useful to understand the situation in as simple a manner as possible in order to understand the driving aspects of density change appropriate to Lake Kivu's conditions. Fortunately this is possible. A simplifying effect has been observed for sodium in the direct experimental observations of Hershey at al., (1983). The transition for a fixed amount of sodium in solution from carbonate to bicarbonate via $(Na_2)^{2+}CO_3^{2-}+CO_2+H_2O \rightarrow 2(Na^+HCO_3^-)$ is known as "loading of the solution" in situations where sodium in the dissolved form of carbonate is used for absorbing CO2 gas into solution, transforming the solution into a predominantly bicarbonate state when "loaded" with CO2. (Industrially, the "Banfield Process" of CO2 capture into carbonate uses a potassium system.) In the context considered here, the question is focused on density change of a solution experiencing the reverse change when driven by photosynthetic uptake of $CO_2$ and $H_2O$: $6CO_2+12H_2O \rightarrow C_6H_{12}O_6+6O_2+6H_2O$. Hershey's measurements indicate that the densities of aqueous solutions of sodium bicarbonate and sodium carbonate are very nearly equivalent when compared on an equal sodium ($Na^+$) basis (at Lake Kivu's temperature of ~25° C.), (see FIG. 2 of Stolaroff, 2013). This basis applies herein. Sodium is conserved in solution through the water treatment process (with the exception of that which is biologically absorbed into produced biomass which may be approximated to be zero for the purpose of these estimates). So the density decrease due to release of $HCO3^-$ from sodium bicarbonate solutions in the transition to sodium carbonate solutions is almost exactly balanced by a volumetric density-increasing change. The sum effect is approximately zero. Another way to state this conclusion is to say that, for a conserved concentration of dissolved sodium in the water type under consideration, a change in its associated anion chemistry from bicarbonate to carbonate does not change the density of the water it is dissolved in despite the removal of carbon. Solution density change therefore may be considered for effects associated with the precipitation of the cations Mg and Ca, and with CO2 and CH4 degassing.

It is here assumed that there is no substantial difference effect for the presence of potassium. Potassium is conserved in solution. It is assumed to follow sodium in respect to the density (non-) effect with pH change from bicarbonate anion complexing to carbonate anion complexing. It also is presumed that density increase effects due to evaporation can and will be corrected. It additionally is assumed that any temperature-related water density effects will not be significant or otherwise will be equilibrated. Lake Kivu approximates an equithermal lake. The total temperature variation range along its depth profile is 4 (Aaberg, 2013; Katsev et al., 2014).

Algal photosynthesis can generate high pH conditions reaching well above pH=10.5. This happens if bio-cultures have bicarbonate-utilizing species compositions, and if they are sufficiently fertilized with phosphorus and nitrogen (or obtains the latter by diazotrophic fixation), and if isolated from CO2 input. Such a high pH condition retains the alkali metal (sodium: Na; and potassium: K) carbonates in solution. However, the behavior of the alkaline earths (Mg and Ca) is different. A condition of pH rising to ~10.5 co-precipitates>90% magnesium as insoluble magnesium hydroxide, $Mg(OH)_2$, and >90% calcium as insoluble calcium carbonate, $CaCO_3$. As shown in Table 1, the component of total dissolved solids (TDS) that are removable from solution are: dissolved magnesium bicarbonate, $Mg^{2+}(HCO_3^-)_2$, and dissolved calcium bicarbonate, $Ca^{2+}(HCO_3^-)_2$. Precipitation of Mg is mostly as hydroxide. Precipitation of calcium is as carbonate. A process of pH-increasing, and $HCO_3$-absorbing, photosynthesis sums the TDS removal in solution to ~2.8 gTDS/l for 100% Mg and Ca removal from Lake Kivu deepwater. An additional 0.4 gTDS/l is removed additionally as biologically absorbed $NH4^+$, P, $SiO_2$, and S, and co-precipitated Sr. This boosts the sum to: ~3.2 gTDS/l, as shown in FIG. 3.

The TDS and WTS method and system removes carbon from solution in five ways. These five ways are (i) by CO2 by degassing; (ii) by photosynthetic carbon-uptake pH pumping whereby two sodium- and potassium-complexed singly-charged bicarbonate $HCO_3^-$ anions are transformed into one doubly-charged carbonate ($CO_3^{2-}$) anions in concert with CO2 capture into photosynthesis adding output of one hydroxyl ion ($OH^-$) into solution; (iii) by precipitating calcium carbonate, $CaCO_3$ from an initial bicarbonate form, $Ca^{2+}(HCO_3^-)_2$, present at lower pH in solution; (iv) by transformation of the dissolved forms of $Mg^{2+}(HCO_3^-)_2$ via $Mg^{2+}(CO_3^{2-})$ and $Mg^{2+}(OH^-)_2$ into $Mg(OH)_2$ precipitate; and (v) by electrochemical production and or other forms of production of additional hydroxyl as needed to achieve substantial co-precipitation of Ca and Mg. The carbon released from the precipitation of Mg via transformation from $Mg^{2+}(HCO_3^-)_2$ to $Mg(OH)_2$ involves photosynthetic absorption of 2 $CO_2$ molecules which stochiometrically yields the two hydroxyl anions required to form $Mg(OH)_2$.

A significant sixth process relates to photosynthetic carbon-uptake and the correspondence between photosynthetic carbon export from solution and a pH pumping consequence by hydroxyl addition into solution. A photosynthesis-linked "Benfield carbon pump," (Stolaroff, 2011), absorbs CO2 injected or diffused into high-pH solutions hosting sodium and potassium carbonate ions, $(Na_2)^{2+}CO_3^{2-}$ and $(K_2)^{2+}CO_3^{2-}$, via: $CO_2+CO_3^{2-}+H_2O \rightarrow 2(HCO_3^-)$. This then allows further photosynthetic carbon-uptake into algal biomass with associated pH pumping in solution by biological addition of $OH^-$. This process in part is responsible for huge continental sodium carbonate deposits from ancient alkaline evaporative basin lakes. Especially at times of higher atmospheric CO2 in the geological past, this process functioned as a CO2 pump out of the atmosphere into evaporitic sodium carbonate deposits (Smith and Carroll, 2015). It can be utilized as a biomimetic technology to boost the total DIC available for pH-boosting in order to precipitate magnesium and calcium out of solution as hydroxide and carbonate, respectively.

FIG. 3 and Table 1 together illustrate the sum of total dissolved solids (TDS) removable from 375 meter depth deepwater by: (i) the precipitation of Mg and Ca and associated bicarbonate out of solution: 2.80 gTDS/l; and (ii) the biological uptake and precipitation and loss from solution of other deepwater trace components (Si, $NH4^+$ complexed as bicarbonate, S and P): ~0.4 gTDS/l, totaling ~3.2 gTDS/l. As shown in FIG. 3 and Table 1, deepwater extracted from a depth of ~375 meters contains Total Dissolved Solids (TDS) of ~5.7 gTDS/l, obtained experimentally as the sum of the following main components: (i) bicarbonate ion at ~4.2 gTDS/l; (ii) the sum of Na and K: ~0.8 gTDS/l; (iii) the sum of Mg and Ca: ~0.5 gTDS/l; (iv) $NH4^+$ ion adding ~0.06 gTDS/l; (v) chlorine: ~0.1 gTDS/l; and (vi) silicon dioxide: ~0.1 gTDS/l. Table 1 shows that the precipitative removal of Mg and Ca and utilization of ammonium ion, and utilization of the sum of their associated biocarbonate ion components from solution sums to 3.0 gTDS/l. Removal of $NH4^+$ ion and its associated bicarbonate ion removes 0.25 gTDS/l from solution. Removal of SiO2, S, P and other trace elements removes an additional ~0.15 gTDS/l. These removals sum to a total removable TDS sum of: ~3.2 gTDS/l. Subtracting this sum from the computed TDS of 5.7 gTDS/l yields a return flow with ~2.5 gTDS/l. To check, for comparison, water containing only Na and K concentration levels matched to those of 375 meters, considered as bicarbonates ("pH-balanced"), will have a total TDS of 2.6 gTDS/l. This checks well to within 0.1 gTDS/l. (The difference probably has to do simply with bicarbonate accounting for $NH_4^+$ in the total TDS estimate in Tassi et al., 2009.) For reference without considering density due to dissolved gases, in Lake Kivu's main basin, TDS is 2.53 gTDS/l at a depth of 150 meters, 2.41 gTDS/l at 125 meters and 2.06 gTDS/l at 100 meters (Tassi et al., 2009).

A TDS-based consideration of the de-densification of the return flow lacks factoring the densification effect of dissolved CO2 and CH4 in the IZ. The return flow water will be fully degassed of CO2 and CH4. Therefore to determine the gas effect, it is necessary to consider dissolved gas levels within the host layer, the IZ, at depths pertinent to locus-of-reinjection considerations. It is easy to compute an effective extra TDS in order to make a adjusted comparison. Data from Tassi et al., (2009) for CO2 in the main basin at a depth of 150 meters indicate: 0.64 gCO2/liter and 0.049 gCH4/liter. Correction using the adjustment data of Schmid applied herein applies a density variation effect of $x(+0.284)(M_{CO2})$ for densification factored by the mass of CO2 present, and an opposite sign effect of $x(-1.25)(M_{CH4})$ for de-densification factored by the mass of CH4 present per liter, $M_{CO2}$. For the IZ at 150 meters depth, the density adjustment for the measured in situ gas is: +0.12 g/l. Therefore, a gas-adjusted effective TDS-based density within the IZ can be estimated for 150 meters as: 2.53+0.12=2.65 gTDS/l. This indicates that degassed return flow water de-densified by Mg and Ca precipitation and by removal of other removable trace components to 2.6 gTDS/l, (or to a lesser density if electrochemical and/or elecrocoagulative methods are applied to increase hydroxyl and decrease Na and K concentrations). Therefore return flow water processed in a WTS within a RFS can be reinjected above 150 meters depth within the IZ. This is shown in FIG. 3. Exact water density expectation estimates are available via the computer program PHREEQCE (see reference). Also from unpublished programs of Christophe Monin and of Severine Dietz in the research group of Bertram Boehrer). Computational model results of course need to be checked against direct experimental measurements (Appelo, 2014; Appelo et al., 2014).

The general inventive insight of this method and system allowing de-densification sufficient for return flow reinjection within the IZ is clear. Extensive tinkering will be required to fine-tune the biological WTS system and also to prepare detailed computational water density models and to experimentally checkpoint them to fine tune their accuracy and precision.

Undersupply of both N and P may be a limiting factor. This depends on in-the-field performance in the domain of nutrient-starvation, a phenomenon where photosynthesizing algae in solutions with rapidly diminishing P and or N nutrients tend to fatten by producing storage lipids. Field-testing on a large scale is required in order to determine actual performance, which also will involve a large natural range of variation from biological aspects intrinsic to the cultivation of microalgae in open systems. For reasons of prudence, the disclosure presumes these nutrients (N and P) may require addition into large-scale open systems in order to be sure the final stage bioculture can reach a pH of 10.5 or higher. This flux can be supplied commercially and/or by nutrient recycling in the process of fast biofuels production such as by the no-catalyst fast hydrothermal liquefaction process (F-HTL, Bach et al. 2014), or by other well-established HTL methods for wet algal biomass slurry processing into biofuels (Elliot et al., 2015 and citations therein). FIG. 5 shows both options representing a preferred embodiment utilizing algal biomass in a biorefinery (item 19).

The abundances of NPK nutrients will allow growth of algae with carbon fixation at about the level of 200 to 400 mgC/l corresponding to a dry weight algal biomass concentration in the range of about 500 to 1000 mg/l under favorable conditions of algal dominance, high efficiency of uptake and nutrient starvation favoring unusual lipid and/or starch storage. Excess N and P nutrients required to boost biomass levels can be obtained commercially or by recycling technologies. In general, Lake Kivu deepwater provides an attractive basis for large-scale algal bioculture with attendant opportunities for algae-based production of biofuels, biopharmaceuticals, bioneutraceuticals and aquaculture-raised fish. Use of Lake Kivu deepwater for bioproduction is broadly analogous to the creation of an "artificial upwelling" in oceanic contexts focused on growing algae and food organisms that eat algae (Roels, O. A., et al., 1979). With respect to the specific disclosure focused herein, algal bioculture is deployed differently as part of an invention focused on removing a substantial TDS component from the deepwater return flow post degassing for methane extraction, thereby solving a major return flow problem in the design and operation of methane extraction and associated power plant systems.

A rough calculation of the minimum degree of N and P fertilization needed can be estimated from standard Redfield ratio ((Redfield Ratio, Wikipedia) data: C:N:P=106:16:1 (in molar relative abundances). Measured phosphorus in 375 m Lake Kivu deepwater has P=0.22 Mm/l. For a Redfield C/P ratio ~106, we therefore have C ~23 mM/l as the associated carbon fixation level. This is only 72% of the minimum P needed for magnesium hydroxyl complexing alone. Similarly, utilizable N in 375 m Lake Kivu deepwater has N=3.2 mM/l. For a Redfield C/N ratio: ~6.6, we have C ~21 mM/l, or only about 66% of the utilizable Nitrogen minimum needed to match the minimum level of carbon fixation required to produce sufficient hydroxyl ion to bind with Mg alone. It can be concluded that both the N and P nutrient levels present in Lake Kivu deepwater possibly will lead to underproduction of necessary hydroxyl. These deficits may be solved by nutrient addition or by a boost from electro-precipitative methods or by an integrated approach allowing flexibility to respond to specific biological conditions as they arise.

In a condition of algal growth in degassed MRZ deepwater isolated from new CO2 input (known as "pH drift"), bioavailable carbon may be estimated as the total carbon available (~0.83 g/l, 69 mM/l) less the amount complexed with soluble Na and K as carbonate and bicarbonate ions. Using the data of Mook, (2000) for zero salinity freshwater at pH=10.4 and T=25 the molar ratio of these anions, $(HCO_3^-)/(CO_3^{2-})$ will be ~1.0. (This is a maximum estimate as the mineral carbonate salinity of Lake Kivu deepwater is not zero. It is ~6 per mil.) Therefore, for Na (21.2 mM/l), and K (8.2 mM/l), and for the complexed species: $Na^+HCO_3^-$, $(Na_2)^{2+}CO_3^{2-}$, $K^+HCO_3^-$ and $(K_2)^{2+}CO_3^{2-}$ we have: (7.1+ 2.7 mM/l $HCO_3^-$) and (7.1+2.7 mM/l $CO_3^{2-}$). To an approximation, therefore the solution-complexed carbon is: $[HCO_3^-]+[CO_3^{2-}]$~19.6 mM. To this may be added the ~3.2 mM/l carbon precipitated out of solution as $CaCO_3$ based on a calcium concentration of ~3.2 mM/l. This determines a sum total of non-bioavailable carbon of ~23 mM/l out of a total of ~69 mM/l. The difference, ~46 mMC/l, (~0.55 g/l), is the bioavailable carbon sourced as bicarbonate ion dominating the Dissolved Inorganic Carbon (DIC) carbon content available in Lake Kivu MRZ deepwater in the post-degassing form of bicarbonate ion at pH ~10 relative to a target pH of 10.5 to 11.

Photosynthetic carbon fixation utilizing bicarbonate can generate hydroxyl ion ($OH^-$) at 708 mg/l, (43 mM/l), per 500 mg of C-fixation. Forty three millimoles per liter $OH^-$ is equal to the amount needed to complex 21.5 mM of magnesium as magnesium hydroxide, $Mg(OH)_2$, precipitatable in the pH interval ~9.8 to 10.5. This is 69% of the available magnesium in solution (31 mM/l). Calcium would fully precipitate from MRZ water as $CaCO_3$ at pH=10.4. Additional hydroxyl ion beyond 43 mM/l is needed from photosynthetic C-fixation to transform the Na-, K-, and Ca-bicarbonate effective buffer from ~100% bicarbonate to a situation of ~50:50 bicarbonate:carbonate chemistry for the alkali metals, and total conversion for Ca from $Ca(HCO_3^-)_2$ to $CaCO_3$. This is ~16 mM/l based on one third the sum of Na (21.2 mM/l) and K (8.2 mM/l) concentrations plus twice the Ca (3.2 mM/l) concentration. Therefore it is estimated that a minimum of ~43 mM/l+~16 mM/l=~59 mM/l hydroxyl ion ($OH^-$) is needed. Photosynthetic uptake of the bioavailable carbon (~46 mM/l, ~0.55 g/l) provides a maximum of only ~46 mM/l of hydroxyl ion ($OH^-$) if utilized with 100% efficiency into photosynthesis, whereas ~~59 mM/l hydroxyl ion ($OH^-$) is needed. Therefore bioavailable carbon is in modest shortfall with respect to the need for hydroxyl ion production to precipitate all magnesium in solution as hydroxide.

The most optimal situation for photosynthetic utilization of all carbon stored initially as bicarbonates ~100% complexing Na, K, Mg and Ca, then converting fully to Na and K carbonates, and with Mg-bicarbonate totally converting to precipitated Mg-hydroxide, and with Ca bicarbonate total conversion to precipitated CaCO3. In this ideally optimal case, the total amount of bioavailable carbon is: (from Na), (0.5)(21.2 mMC/l), plus, (from K), (0.5)(8.2 mMC/l), plus, (from hydroxide-precipitated Mg), (2)(15.6 mMC/l), plus, (from Ca), (1)(3.2 mMC/l). The sum is: 49.1 mM, (0.59 g/l), bioavailable carbon per liter. This does not close the gap.

The existence of such a gap is made moot by pH control by CO2 removal in TDS operations. Such control allows extraction of substantial Mg and Ca from return flow water prior to photosynthetic biological water treatment. Lake Kivu deepwater from the MRZ is very highly supersaturated in Mg and Ca under conditions of extraction and total degassing with the potential completely to remove CO2. This follows from the solubility product for magnesium hydroxide $Ksp=[Mg^{2+}][OH^-]^2=1.5 \times 10^{-11}$. This determines a molar solubility of 0.16 mM/l solubility for $Mg(OH)_2$ and a pH=10.5 for a saturated equilibrium solution at 25 degrees C. with no CO2. This condition is modulated to lower pH and sub-saturation of $Mg(OH)_2$ by CO2 control. The concentration of Mg in 375 meter Lake Kivu deepwater, for example, is 15.6 mM/l, with an extremely high dissolved CO2 concentration: 62 mM/l; 2.7 g/l, (Tassi et al., 2009).

In high-pH conditions with Na and K complexed with carbonate ions, staged CO2 injection into biocultures can allow gain in algal biomass. This, however, requires fertilizer addition rather than nutrient starvation. Chemical control of fertilizer addition can provide additional hydroxyl ion from algal nitrogen uptake via nitrate, $NO_3$, (Goldman et al., 1982; Mattson et al., 2009; Scherholz and Curtis, 2013; Nguyen and Rittmann, 2015). A suitable source of fertilizing nitrogen might be sodium nitrate. Detailed active control delivering additional hydroxyl ion can be obtained by electrochemical methods such as membrane electrodialysis using intake of a fraction of return flow water after Ca and Mg precipitation (Astom Corporation, undated; Huang and Xu, 2006; Xu and Huang, 2008; and futuristically: Cheng and Chang, 2011; Contento and Bohn, 2014; Zhou et al., 2014). These methods also can remove fractions of the $Na^+$ and $K^+$ flux in the return flow.

A scale to supply nitrogen and phosphorus can be estimated beginning with the standard "Redfield" formula for algae: $C_{106}H_{236}O_{110}N_{16}P$ (in molar proportion). The latter specifies the following molar ratios: (i) [C/P]~106 and (ii) [C/N]~106/16. The phosphorus abundance in MRZ deepwater is ~0.22 mM/l. This matches 23 mM/l, (0.28 g/l), of carbon per the average algal stoichiometry at a Redfield molar ratio of C/P ~106. The ammonium ion abundance in MRZ deepwater is 3.2 mM/l. If carried forward into the WTS phase, this abundance matches 21 mM/l, (0.25 g/l), of carbon per the average algal stoichiometry at a Redfield molar ratio of C/N ~6.6. Four factors impact realistic estimates. The first is that Lake Kivu seston has super-Redfield [C/P] and [C/N] by large factors, typically >x2. Pre-harvest "nutrient starvation" is a favorable condition for lipid storage. Nutrient starvation boosts algal cells towards >x2 super-Redfield carbon storage (C/P>200; C/N>13) as observed for Lake Kivu seston. The second factor is that some algae can be grown for end-stage pH-boosting that are diazotrophic (viz., some high-pH cyanobacteria). The third factor is that the salinity and temperature condition of the bioculture in harvest conditions of high sunlight intensity in a shallow black-bottomed system will change the (freshwater zero salinity) bicarbonate-carbonate equilibria positions (Mook, 2000) in a favorable direction for Mg and Ca precipitation at lower pH. In a Bjerrum plot of the carbonate equilibrium system (Anderson, 2002; https://en.wikipedia.org/wiki/Bjerrum_plot; https://en.wikipedia.org/wiki/Ocean_acidification), the locations of the equilibrium curves for bicarbonate and carbonate abundances and their equivalence points are highly sensitive to "salinity" (defined in the inclusive technical sense) within the pH range 9 to 11 (Stumm and Morgan, 1970-1995; Butler, 1982-1991; Talling, 1985, 2010; Mook, 2000; Zeebe and Wolf-Gladrow, 2001; Wolf-Gladrow et al., 2007). For example, the carbonate anion molar concentration equivalence point, $(HCO_3^-)/(CO_3^{2-})=1$, is located at =pH 8.9 in seawater, whereas it is located at pH=10.2 in the case of idealized zero ionic strength freshwater (as may be seen in the figure 2 Bjerrum plot of the paper of Wolf-Gladrow et al., 2007). The salinity of Lake Kivu deepwater is ~6 g/kg compared to standard seawater at ~35 g/kg salinity: about $\frac{1}{6}^{th}$ of seawater, though compositionally very different. The salinity of Lake Kivu deepwater is dominated by a (Mg, Na)-bicarbonate composition rather than by NaCl. The fourth factor is that electrochemical methods and systems can be utilized to boost the input of hydroxyl ion sufficiently to ensure complete bioflocculative Mg and Ca precipitation.

Water in the return flow after water treatment will be oxic as a result of photosynthetic algal growth. However, if this waterflow contains microparticulate biomass residues of algal production, it will provide a basis for oxygen-consuming bacterial growth. In the darkness of the deep lake, this process will absorb oxygen by means of bacterial respiration and deoxygenate its host water. Once in anoxic conditions, sedimenting biomass will be converted in part into methane, thereby enriching the gas reserves.

In the WTS, once the resulting precipitate-flocculated algal biomass has been separated by an appropriate industrial method, (for example by microbubble floatation and skimming), then the de-densified return flow water is reinjected into Lake Kivu. This is done horizontally in a manner suppressing turbulence and density-matched to the water density of its injection level.

The amount of de-densification cleaning of the deepwater by the water treatment method and system disclosed herein is to a degree that allows the return flow to be reintroduced into the lake, density-matched, on top of more dense methane-bearing water layer reserves. This creates a situation that over time "pushes down" the methane-bearing reserves (MRZ, PRZ, and lower IZ) in concert with the initial deepwater-obtaining process of extraction from below by extraction pipes. This greatly increases the total accessible methane reserves, in part by avoiding dilution of the MRZ and/or PRZ over time, and in part by making it possible to capture the methane reserves of the PRZ and part of the IZ. Capture of methane from the PRZ and part of the IZ is possible by the total degassing method and system. This may be practiced either after exhaustion of the MRZ reserve, or by co-extraction during extraction of the MRZ, or by both strategies deployed in combination. Co-extraction of the PRZ and IZ is shown in FIG. 1 as an option by vectors marked 3 and 4, respectively.

The method and system disclosed herein is an overall design. In practical application it will include many and various sub-methods and sub-systems for water containment, storage, flow, pumping, thermal management, and injection at depth with minimized vertical flow and turbulence. The systems include apparatuses for water handling and for bioculture compositional management, and also for monitoring of water and bioculture properties, all aimed in coordination to support and optimize yields and efficiencies in the growth, harvesting and or trophic feed utilization of algal-bacterial biocultures in the context of operations on Lake Kivu designed to allow realization of the main aim of the disclosed invention: to de-densify water used for gas extraction in order to optimize its density properties for return flow at levels above the main discontinuity with preference for injection substantially above the top of the PRZ.

FIG. 5 shows schematic aspects of the WTS operating within a larger RFS method and system. Some parts may be floating structures. Bioculture segments may be open air or covered in a sealed greenhouse-like manner. The latter is utilized for control over gas exchange involving CO2 and other gases. Some structures may be described as floating artificial rivers. These systems are not open pond algae production systems of the familiar Oswald type. They also are not photobioreactors of any of the types used for large scale algae production. A general feature of the system is that it is a flow-through system admitting mostly constant inflow from one or more TDS units into WTS intake (1). In some preferred embodiments, intake will be via precipitation and precipitate separation (22) and utilization (22b) operations with pH control from the TDS (not shown, feeding into the intake flow shown as a vector labeled 1) providing Mg- and Ca-oversaturated flow. Post-precipitation (22), re-addition of CO2 (14a, b) into the WTS intake flow causes undersaturation by pH-lowering, effecting a pH control system as shown. Flow for reinjection into Lake Kivu is via exit an flow system (10) which is part of the overall RFS. Post-Inflow (2) and pre-outflow (9) reservoirs are shown. These allow inflow and outflow to be continuous, but with discontinuous and modulated flow through light/dark, day/night-differentiated bioculture and other stages such as filtration in preferred embodiments. Flow through stages involving photosynthetic activity can be slowed or stopped when either it is night or when sunlight is highly diminished. Stations for flow restriction and pumping are not shown in this schematic. In preferred embodiments, they may be constructed in various locations such at transition points in the schematic such as 2-3, 3-4, 5-6, and 6-7. Flow is shown by the black arrows. Inflow comes from the flow exiting the degassing unit as shown in FIG. 1, items 5 and 8, and from precipitation and precipitate separation operations (22) linked with precipitate processing (21), when present in certain preferred embodiments. FIG. 5 shows stages of water treatment from intake (1) to outflow (10) into the reinjection pipes system. The transition shown includes, as a preferred embodiment, the option of $CO_2$ dissolution for pH balancing (16) with $CO_2$ supplied via a supply pipe controlling method and/or system for CO2 injection into bioculturing stages (13). Optional $CO_2$ inputs are shown via 14 and 15a, b into bioculturing zones 2 and 3 corresponding to deployment of multi-staged methods in some preferred embodiments.

The disclosed method and system does not specify a staged process in detail. It opens a flexible range of possibilities utilizing CO2 input with pH control following the general chemical system shown in FIG. 4. FIG. 5 illustrates an example of two basic algal growth stages (2+3, 6) with a production extension for zooplankton and fish production (11) utilizing stage-1 biomass, also shown. Overall, therefore, three bioculturing stages are shown in the schematic representation in FIG. 5 representing a preferred embodiment including two-stage operations of algal growth preceded by a stage of pH-controlled precipitate formation and separation, with an additional side staging of trophic stepping from algae to zooplankton for fish feeding, and production of both if desired. Fertilizer inputs are shown as items 18 and 20, 20b, as examples, but may be applied throughout the WTS as needed. The first bioculturing zone shown (2) is a large storage reservoir present in some preferred embodiments. It may or may not be open to sunlight or may have controls on sun, shade or darkness. Introduction points for algal and or bacterial innocula may be in any location into any bioculturing zone (2,3,6), or in the in-feed systems into these zones. The second bioculturing zone (3) is included in some preferred embodiments. It may involve flow over many days or even weeks in some preferred embodiments. It grows algal-bacterial biomass as well as removes TDS density from the flow of water. A trophic pyramid aspect is be employed to grow zooplankton in some preferred embodiments. Biomass may be partly harvested in a harvesting system at stage 4 where it may be separated to feed zooplankton for direct harvest as a product or to feed fish in fish tanks or pens (11) in relation to a production facility (12) producing products for local distribution and export. The biomass also may be harvested for processing directly in a facility (17) for separation of products for distribution and export, though such a facility is not included within the invention disclosed herein. Not shown in the figure is transfer of remainder biomass waste into a biofuels processing and nutrients recycling facility (19), (such a facility also not being included within the invention disclosed herein). Optional nutrient input points are shown for various preferred embodiments in various locations (18, 18b, 20, 20b), including location 5, which is shown in a context of preparation for a final bioculturing stage leading into high pH conditions. Those nutrient inputs that are recycled are 20, 20b. Utilization operations for precipitate are shown as icons 21a and 21b. A third stage of bioculturing for biomass growth and excess density removal is shown (6). It is a preferred embodiment leading into two separation zones which in various preferred embodiments may or may not be integrated. In some preferred embodiments, a third bioculturing zone (3) may involve flow over many days or even weeks. The first (7) of these end stage separation zones is for autoflocculation of algal-bacterial biomass by precipitative binding with magnesium hydroxide along with co-precipitated calcium carbonate. Microbubble flotation and skimming systems may be used to facilitate separation of flocculated biomass. In some preferred embodiments, harvested biomass may be inputted into a biomass processing facility (19) for nutrients recycling separation, fertilizers production, and biofuels production. The second of the end-stage separation zones (8) is for completion of the separation-removal process for magnesium as magnesium hydroxide in the pH range ~10.2 to ~10.5. In preferred embodiments, this zone may utilize electrochemical, and/or electrocoagulative, and/or electroflocculative equipment.

The invention disclosed herein applies usefully to the design and execution of one or more large industrial projects combining "upstream" natural gas production with "downstream" power production also utilizing and treating return flow water for algal bioproduction and for removal from solution, by precipitative processes, of magnesium and calcium. The information provided herein, in the context of what the invention is, is sufficient to enable appropriate persons skilled in the art to practice the invention without undue experimentation, though of course including all experimentation as is normal and appropriate to the actual proper and responsible completion of projects of the type the invention applies to.

The invention disclosed herein is not limited to preferred scales in terms of flow capacities for any extraction pipes, or degassing stacks, or bubble capture units, or degassing catalyst units, or for any specific vacuum degasifier units, with or without connected power recycling units, or for any return flow systems with bioproduction and precipitation operations with harvesting and collection systems and with reinjection systems and outlet diffusers. Oxy-fuel turbine generators, however, can have preferred scales based on efficiency, production by conversion of existing specific turbine models, and various other commercial factors.

One possible oxy-fuel turbine scale for high efficiency produces roughly 400 megawatts of power. For continuous operation, and for estimates for the high efficiency performance of the method of the invention herein disclosed, the relationship between electric power output and deepwater input from the MRZ of Lake Kivu is: ~132,000 metric tonnes of methane per year per 100 megawatts (MW). This amount of fuel inflow corresponds to ~0.53 cubic kilometers per year of deepwater containing ~250 g methane per cubic meter. The corresponding rate of water processing is ~60,000 cubic meters of water per hour or ~17 cubic meters per second. It can be prudent for various reasons to utilize standard pipe sizes and implement systems of several extraction pipes rather than one giant large diameter pipe. With a pipe of 1.9 meters internal diameter, for example, an average flow velocity of 2 meters per second yields a flow-per-pipe of ~5.7 cubic meters per second. Three such extraction pipes are required in order to supply 100 MW, or ¼ of the full 400 MW output of the power generator system. Therefore an extraction array of 12 pipes of inside diameter 1.9 meters will be appropriate for the lower part of the extraction-degassing array between ~~440 meters depth and ~40 meters depth. The coupling of such an array into degassing operations typically will integrate pipe-flow into a smaller number of upper-level vacuum degassing units such as three or two or one. These decisions also may depend on standardization and on equipment transportation and construction criteria and decisions. More broadly, all such decisions may be influenced by concessionary and regulatory constraints.

Flow size scaling for a Return Flow System (RFS) and the Water Treatment System (WTS) within it, for a 400 MW power plant operation, extracts ~2 km3 deepwater per year. This is ~70 cubic meters per second, corresponding to 2,400 cubic feet per second. That size of flow is the scale of a substantial river. The areal extent of algal growth operations for such a flow would be very large. Containment of flow would be within slow-flowing sectors constructed on the surface of Lake Kivu with photosynthetically appropriate depth, and bounded by bottom sheeting slung between floatpipe boundaries. The present disclosure does not disclose a method and system for such "floating river" structures and the organization of their flow behavior.

While the invention has been described in detail and with reference to specific examples thereof, it will be apparent to one skilled in the art that various changes and modifications can be made therein without departing from the spirit and scope thereof.

REFERENCES CITED

1. Aaberg, A. A., (2013). Warming and stratification changes in Lake Kivu, East Africa. MSc Thesis, University of Minnesota, online: http://www.d.umn.edu/~-skatsev/Publications/AabergThesisKivu.pdf
2. Abrams, I. M., et al., 1999. Chapter 8: Removing Specific Contaminants. In: Environmental Engineer's Handbook. Editors: Liu, D. H. F., and Liptak, B. G. (CRC Press)
3. Andersen, C. B., (2002). Understanding carbonate equilibrium by measuring alkalinity in experimental and natural systems. J. Geoscience Education, 50(4): 389-403
4. Appelo, C. A. J., 2014. Principles, caveats and improvements in databases for calculating hydrogeochemical reactions in saline waters from 0 to 200 C and 1 to 1000 atm. Applied Geochemistry, November DOI: 10.1016/j.apgeochem.2014.11.007
5. Appelo, C. A. J., Pankhurst, D. L., Post, V. E. A., 2014. Equations for calculating hydrogeochemical reactions of minerals and gases such as $CO_2$ at high pressures and temperatures. Geochimica Et Cosmochimica Acta 125, 49-67.
6. Astom Corporation, (undated). Product sheet: Bipolar membrane electrodialyzer. Online: http://www.astom-corp.jp/en/product/05.html
7. Aulenbach, D. B., Shammas, N. K., Wang, L. K., Marvin, R. C., 2010. Algae removal by floatation. pp. 363-399 (Chapter 11) In: Handbook of Environmental Engineering, v 12: Flotation Technology. Eds. Wang, L. K., et al. Springer (New York).
8. Azov, Y., 1982 Effect of pH on Inorganic Carbon Uptake in Algal Cultures. Appl. Environ. Microbiol., v. 43: 1300-1306.
9. Bach, Q., V., Sillero, M. V., Tran, K-Q, Skjermo, J., 2014. Fast hydrothermal liquefaction of a Norwegian macroalga: Screening tests. Algal Research, v. 6B: 271-276.
10. Baya, D. T., Tangou, T. T., Effebi, K. R., Zouhir, F., Vasel, J.-L., 2014. Caracterisation des phenomenes d'autofloculation, de biofloculation et de co-floculation des microalgues dans un chenal algal a haut rendement (synthese bibliographique). Biotechnol. Agron. Soc. Environ. 18(1): 75-82.
11. Besson, A., Guiraud, P., 2013. High-pH-induced flocculation-flotation of the hypersaline microalga Dunaliella

*salina*. Bioresource Technology 147: 464-70. doi: 10.1016/j.biortech.2013.08.053.
12. Boehrer, B., Schultze, M., 2008. Stratification of lakes. Revs. Geophys. 46 RG 2005, 27 pages.
13. Boehrer, B., Schultze, M., 2009. Density stratification and stability. In: Encyclopedia of Inland Waters (2009), Editor: Likens, G. E., vol. 1, pp. 583-593.
14. Butler, J. N., (1982-1991). *Carbon Dioxide Equilibria and their Applications*. Addison-Wesley. 1991 edition, CRC Press, pp. 272.
15. Cerco C. F., Threadgill, T., Noel, M. R., and Hinz, S., (2013). Modeling the pH in the tidal fresh Potomac River under conditions of varying hydrology and load. Ecological Modelling, 257: 101-112
16. Chen, Shulin, Chi, Zhanyou, Xie, Yuxiao, and Zhao, Baisua, 2011/2013. Patent application: INTEGRATED CARBON CAPTURE AND ALGAE CULTURE. US 2013/0319059 A1
17. Cheng, L.-J., and Chang, H.-C., (2011). Microscale pH regulation by splitting water. Biomicrofluidics, 5: 046502
18. Choi, J.-Y., 2014. pH-induced Flocculation/Deflocculation Process for Harvesting Microalgae from Water. PhD Thesis. University of Texas, Austin http://repositories.lib.utexas.edu/handle/2152/25946
19. Chi, Z., James V O'Fallon, J. V., Chen, S., 2011. Bicarbonate produced from carbon capture for algae culture. Trends in Biotechnology, 29 (11): 537-541.
20. Chi, Z., Elloy, F., Xie, Y., Hu, Y, Chen, S. 2014. Selection of Microalgae and Cyanobacteria Strains for Bicarbonate-Based Integrated Carbon Capture and Algae Production System. Applied Biochem. Biotech., v. 172: 447-457.
21. Chi, Z., Xie, Y., Elloy, F., Zheng, Y., Hu, Y, Chen, S. 2014. Bicarbonate-based integrated carbon capture and algae production system. Bioresource Tech., v. 133: 513-521.
22. Clean Energy Systems (2006) Project report for the California Energy Commission, "Durability and Reliability Demonstration of a Near-Zero-Emission Gas-Fired Power Plant," (CEC 500-2006-074) http://www.energy.ca.gov/2006publications/CEC-500-2006-074/CEC-500-2006-074.PDF
23. Contento, N. M., and Bohn, P. W., (2014). Tunable electrochemical pH modulation in a microchannel monitored via the proton-coupled electro-exodation of hydroquinone. Biomicrofluidics, 8: 044120
24. Descy, J-P., Darchambeau, F., Schmid, M., 2012 (editors). Lake Kivu: Limnology and Biochemistry of a Tropical Great Lake. Springer. 192 pp.
25. Duraisamy, R. T., Beni, A. H., Henni, A., 2013. State of the Art Treatment of Produced Water. Chapter 9. pp. 199-222. In: Water Treatment. Eds W. Elshorbagy and R. K. Chowdhury ISBN 978-953-51-0928-0, 392 pages, Publisher: InTech
26. Eckert, W., Hambright, D., 1996. Seasonal and Vertical Distributions of Temperature, pH, Oxygen and Sulfide in Lake Kinneret. Limnologica 26(4): 343-335.
27. Elliot, D. C., Biller, P., Ross, A. B., Schmidt, A. J., Jones, S. B., 2015. Hydrothermal liquefaction of biomass: Developments from batch to continuous process. Bioresource Technology, v. 178: 147-156.
28. Elmaleh, S., Coma, J., Grsmick, A., and Bourgade, L., (1991). Magnesium induced algal flocculation in a fluidized bed. Water Sci. Tech., 23: 1695-1702.
29. Garcia-Perez, J. S., Beuckels, A., Vandamme, D., Depraetere, O., Foubert, I., Parraa, R., Muylaert., K., 2014. Influence of magnesium concentration, biomass concentration and pH on flocculation of *Chlorella vulgaris*. Algal Research, v. 3: 4-29.
30. Goldman, J. C., Dennett, M. R., and Riley, C. B., (1982). Effect of nitrogen-mediated changed in alkalinity on pH control and CO2 supply in intensive microalgal cultures. Biotechnol. Bioeng., 24(3): 619-631.
31. Gonzalez-Ferndandez, C., Ballesteros, M., 2012. Microalgae autoflocculation: An alternative to high-energy consuming harvesting methods. J. Appl. Physcology, v. 25: 991-999.
32. Giordano, M., Beardall, J., Raven, J. A., 2005. $CO_2$ concentrating mechanisms in algae: mechanisms, environmental modulation, and evolution. Ann. Rev. Plant Biol., 56:99-131.
33. Golueke, C. G., Oswald, W. J., 1965. Harvesting and processing sewage-grown planktonic algae. J. Water Pollut. Control Fed., 471-498.
34. Halbwachs, Michel. Web site: http://mhalb.pagesperso-orange.fr/kivu/eg/index.htm
35. Hanotu, J., Bandulasena, H., and Zimmerman, W. B., (2012) Microflotation performance for algal separation. Biotechnol Bioeng, 109(7). 1663-1673.
36. Hanotu, J., Ying, K., Shada, O. I., Bandulasena, H., and Zimmerman, W. B., (2013). Microalgae recovery by microflotation for biofuel production using metallic coagulants. Biofuels 4(4): 363-369.
37. Hammer, Th., Keyser, J., Bolland, O., 2009. Natural Gas Oxy-Fuel Cycles—Part 2: Heat transfer analysis of a gas turbine. Energy Procedia 1: 557-564.
38. Harrison, John. TechEco Pty Ltd. Website: http://www.tececo.com
39. Hecky, R., Reinthal, P. 2010. The late Pleistocene-Holocene History of the Lake Kivu Ecosystem. Slides given at: Tropical Rift Lake Systems: Integrated Volcanologic, Tectonic, and Biogeochemical, and Geohazard Assessment of Lake Kivu Gisenyi, Rwanda Jan. 13-15, 2010 (http://dirs.cis.rit.edu/taxonomy/term/26) www.cis.rit.edu/~axvpci/docs/Kivu/Hecky_Kivu%20presentation%20Gisenyi%20version%201.pdf
40. Hershey, J. P., Sotolongo, S., and Millero, F. J., (1983). Densities and compressibilities of aqueous sodium carbonate and bicarbonate from 0 to 45° C. J. Solution Chem., 12(4): 233-254
41. Huang, C., and Xu, T., (2006). Electrodialysis with bipolar membranes for sustainable development. Environ. Sci. Technol., 40(17): 5233-5243
42. Hussain, M. A. 2001. Vacuum degasifier: comprehensive modelling and simulation. Vacuum, v. 60: 325-337.
43. Imboden, D. M., and Wuest, A., 1996. Mixing mechanisms in lakes. In: Physics and Chemistry of Lakes. Ed. A. Lerman, pp. 83-138. Springer, Berlin.
44. Jericha, H., Fesharaki, M., 1995, "The Graz Cycle—1500° C. Max Temperature Potential H2-O2 Fired $CO_2$ Capture with CH4-O2 Firing", ASME Paper 95-CTP-79, ASME Cogen-Turbo Power Conference, Vienna, Austria
45. Katsev, S., Aaberg, A. A., Crowe, S. A., and Hecky, R. E., (2014). Recent warming of Lake Kivu. PLoS One, 9(10): e109084, online: http://www.plosone.org/article/fetchObject.action?uri=info:doi/10.1371/journal.pone.0109084&representation=PDF
46. Keymer, P. C., Lant, P. A., and Pratt, S., (2014). Modelling microalgal activity as a function of inorganic carbon concentration: accounting for the impact of pH on the bicarbonate system. J. Appl. Phycol., 26: 1343-1350

47. Kling, G. W., Tuttle, M. L., Evans, W. C., 1989. The evolution of thermal structure and water chemistry in Lake Nyos. J. Volcanology and Geothermal Research, v. 39: 151-165.
48. LKMP, (2010). Management Prescriptions for the Development of Lake Kivu Gas Resources. Ministry of Infrastructure, Republic of Rwanda and Ministry of Hydrocarbons, Democratic Republic of Congo. Prepared by the Expert Working Group on Lake Kivu Gas Extraction. https://www.eawag.ch/fileadmin/Domain1/Abteilungen/surf/projekte/kivu/kivu_management_prescriptions.pdf
49. Langmuir, D. 1997. Aqueous Environmental Geochemistry. Prentice Hall, 600 pp.
50. Liska, M and Al Tabbaa, A., 2007. Performance of magnesia cements in pressed masonry units with natural aggregates: production parameters optimization. Construction and Building Materials, 22. pp. 1789-1797. ISSN 0950-0618
51. Liska, M and Al Tabbaa, A., 2009. Ultra-green construction: reactive magnesia masonry products. Proceedings of ICE, Waste and Resource Management, 162. pp. 185-196. ISSN 1747-6526
52. Liska, M and Vandeperre, L J and Al Tabbaa, A., 2008. Influence of carbonation on the properties of reactive magnesia cement-based pressed masonry units. Advances in Cement Research, 20. pp. 53-64. ISSN 0951-7197
53. Liska, M and Al-Tabbaa, A., 2008. Performance of magnesia cements in pressed masonry units with natural aggregates: Production parameters optimization. Construction and Building Materials, 22. pp. 1789-1797.
54. Lorke A. Tietze K. Halbwachs M. and Wüest A. (2004) Response of Lake Kivu stratification to lava inflow and climate warming. Limnol. Oceanogr. 49:778-783.
55. Mattson, N., Leatherwood, R., and Peters, C., (2009). Nitrogen: all forms are not equal. GMPro Magazine, June 2009, reprinted online by Cornell University Cooperative Extension: http://www.greenhouse.cornell.edu/crops/factsheets/nitrogenform.pdf
56. Millero, F. J., 2000. The equation of state of lakes. Aquatic Geochemistry 6: 1-17.
57. Monnin, C., 1994. Density calculations and concentration scale conversions for natural waters. Computers and Geosciences, 20, 1435-1445.
58. Mook, W., (2000). Chemistry of carbonic acid in water. Chapter 9, pp. 143-165 in: *Environmental Isotopes in the Hydrological Cycle: Principles and Applications*. INEA/UNESCO, Paris, online: https://ay14-15.moodle.wisc.edu/prod/pluginfile.php/172623/mod_resource/content/5/Carbonate%20System%20Chemistry.pdf
59. Nguyen, B. T., and Rittmann, B. E., (2015). Predicting dissolved inorganic carbon in photoautotrophic microalgae culture via the nitrogen source. Environ. Sci. Technol., 49(16): 9826-9831
60. O'Connor, J. T., O'Connor, T., Twait, R. 2009. Water Treatment Plant Performance Evaluations and Operations. ISBN: 978-0-470-28861-0 308 pp. (Wiley)
61. Pasche N. Dinkel C. Müller B. Schmid M. Wüest A. and Wehrli B., 2009. Physical and biogeochemical limits to internal nutrient loading of meromictic Lake Kivu. Limnol. Oceanogr. 54:1863-1873.
62. PHREEQC (Version 3)—A Computer Program for Speciation, Batch-Reaction, One-Dimensional Transport, and Inverse Geochemical Calculations. USGS; http://wwwbr-r.cr.usgs.gov/projects/GWC_coupled/phreeqc/63.
63. Psenner, R., and Catalan, J., (1994). Chemical composition of lakes in crystalline basins: a combination of atmospheric deposition, geologic background, biological activity and human action. Pp. 255-314 in: R. Margalef (ed.), *Limnology Now: A Paradigm of Planetary Problems*. Elsevier
64. Redfield Ratio. http://en.wikipedia.org/wiki/Redfield_ratio
65. Revzani, S., Bolland, O., Huang, Y., Span, R., Keyser, J., Sander, F., McIlveen-Wright, D., Hewitt, N., 2009. Natural Gas Oxy-Fuel Cycles—Part 3: Economics. Energy Procedia 1: 565-572.
66. Rodriguez, C., and Millero, F. J., (2013). Modeling the density and isentropic compressibility of seawater. J. Solution Chem., 42: 303-316
67. Roels, O. A., Laurence, S., Hemelryck, L. V., 1979. The utilization of cold, nutrient-rich deep ocean water for energy and mariculture. Ocean Management, v. 5(3): 199-210.
68. Ross, K. A. (2013a). PhD Thesis (ETH-Zurich). The Effect of Subaquatic Volcanism on the Structure of Lake Kivu in the Albertine Rift, East Africa.
69. Ross, K. A. 2013b. Slide deck presented at the November Lake Kivu AVCOR (Active Volcanism & Continental Rifting) meeting.
70. Ross, K. A., Schmid, M., Ogorka, S., Muvundja, F. A., Anselmetti, F. S., (2015). The history of subaquatic volcanism recorded in the sediments of Lake Kivu, East Africa. J. Paleolimnol., 54(1): 137-152
71. Ross, K. A., Smets, B., De Batist, M., Hilbe, M., Schmid, M., Anselmetti, F. S. 2014. Lake-level rise in the late Pleistocene and active subaquatic volcanism since the Holocene in Lake Kivu, East African Rift. Geomorphology, 221: 274-285.
72. Ross, K. A., De Batist, M., Anselmetti, F. S., Schmid, M., Wuest, A. 2012. A high resolution bathymetric map of Lake Kivu's Northern basin: locating significant groundwater inflows through a geomorphologic interpretation. 50 pp. SwissSed, Fribourg
73. Schmid M, Tietze K, Halbwachs M, Lorke A, McGinnis D, Wüest A., 2003. How hazardous is the gas accumulation in Lake Kivu? Arguments for a risk assessment in light of the Nyiragongo volcano eruption of 2002 Acta Volcanologica, v 14: 115-121.
74. Schmid, M., Halbwachs, M., Wehrli, B., Wuest, A., 2005. Weak mixing in Lake Kivu: New insights indicate increasing risk of uncontrolled gas eruption. Geochemistry, Geophysics, Geosystems, v. 6: Q07009.
75. Shiraiwa Y, Goyal A, Tolbert N E (1993) Alkalinization of the medium by unicellular green algae during uptake of dissolved inorganic carbon. Plant Cell Physiol 34: 649-57.
76. Smith, B. T., Davis, R. H., 2012. Sedimentation of algae flocculated using naturally-available magnesium-based flocculants. Algal Research, v. 1: 32-39.
77. Smith, M. E., and Carroll, A, R., (2015). *Stratigraphy and Paleolimnology of the Green River Formation, Western USA*. Springer, pp. 355
78. Spilling, K., Seppala, J., Tamminen, T., 2010. Inducing autoflocculation in the diatom *Phaeodactylum tricornatum* through $CO_2$ regulation. J. Appl. Phycology v. 23: 959-966 DOI 10.1007/s10811-010-9616-5
79. Spinu, V. C., Albright, L. D., and Langhans, R. W., (1997). Electrochemical pH control in hydroponic systems. Acta Horticulturae, 456: 275-281, online: https://www.researchgate.net/publication/242418052_ELECTROCHEMICAL_pH_CONTROL_IN_HYDROPONIC_SYSTEMS 80. Stolaroff, J. K., (2013). Carbonate solutions for carbon capture: a summary. Lawrence Laboratory National Report LLNL-TR-644894, online: https://e-reports-ext.1lnl.gov/pdf/764798.pdf
81. Stumm, W., and Morgan, J. J., (1970-1995). *Aquatic Chemistry: An Introduction Emphacizing Chemical Equilibria in Natural Waters*. Wiley-Interscience. Third edition: 1995: *Aquatic Chemistry: Chemical Equilibria and Rates in Natural Waters*. Wiley
82. Talling, J. F., (1976). The depletion of carbon dioxide from lake water by phytoplankton. J. Ecol., 64(1): 79-121
83. Talling, J. F., (1985). Inorganic carbon reserves of natural waters and ecophysiological consequences of their photosynthetic depletion: micro-algae. Pp. 403-420, in: W. J. Lucas and J. Berry (eds.), *Bicarbonate Transport and Utilization by Plants*. American Society of Plant Physiologists.
84. Talling, J. F. 2010. pH, the $CO_2$ System and Freshwater Science. Freshwater Reviews 3(2):133-146; DOI: 10.1608/FRJ-3.2.156
85. Tassi, F., Vaselli, O., Tedesco, D., Montegrossi2 G., Darrah, T., Cuoco, E., Mapendano, M. Y., Poreda, R., Delgado Huertas, A. 2009. Water and gas chemistry at Lake Kivu (DRC): Geochemical evidence of vertical and horizontal heterogeneities in a multibasin structure. G3: Geochemistry, Geophysics, Geosystems, v. 10(2), DOI: 10.1029/2008GC002191
86. Tesson, B., Gaillard, C., Maryin-Jezequel, V., 2008. Brucite formation mediated by the diatom *Phaeodactylum tricornatum*. Marine Chemistry, v. 109: 60-76.
87. Thierry, W. et al. 2014. LakeMIP Kivu: evaluating the representation of a large, deep tropical lake by a set of one-dimensional lake models. Tellus, Ser A. 66; 21390.
88. Tietze K. (1978) Geophysikalische Untersuchung des Kivusees und seiner ungewohnlichen Methangaslagerstatte—Schichtung, Dynamik und Gasgehalt des Seewassers, thesis es Sciences, 150 pp, Christian-Albrechts-Universitat, Kiel.
89. Tietze, K., 1981. Direct measurements of the in-situ density of lake and sea water with a new underwater probe system. Geophysica, 17 (1-2), 33-45
90. Tietze, K. (2007), Basic plan for monitoring, regulating and steering exploitation of the unique methane gas deposit in Lake Kivu: safely, environmentally soundly and with optimal yield. Report commissioned by W+S Beteiligungs AG. PDT Gmbh/Dr. Klaus Tietze.
91. Tucker, C. S., and D'Abramo, L. R., (2008). Managing high pH in freshwater ponds. Southern Regional Aquaculture Center, SRAC Publication No. 4604, online: http://www2.ca.uky.edu/wkrec/High-pH-Ponds.pdf
92. Unluer, C and Al-Tabbaa, A, 2013. Impact of hydrated magnesium carbonate additives on the carbonation of reactive MgO cements. Cement and Concrete Research, 54. pp. 87-97.
93. Unluer, C and Al-Tabbaa, A., 2013. Characterization of light and heavy hydrated magnesium carbonates using thermal analysis. Journal of Thermal Analysis and Calorimetry. pp. 1-13.
94. Unluer, C and Al-Tabbaa, A., 2014. Enhancing the carbonation of MgO cement porous blocks through improved curing conditions. Cement and Concrete Research, 59. pp. 55-65.
95. Unluer, C and Al-Tabbaa, A., 2014. Characterization of light and heavy hydrated magnesium carbonates using thermal analysis. Journal of Thermal Analysis and calorimetry, 115. pp. 595-607.
96. van Hille, R., Fagan, M., Bromfield, L., Pott, R., 2014. A modified pH drift assay for inorganic carbon accumulation and external carbonic anhydrase activity in microalgae. J. Appl. Phycol., v. 26: 377-385.
97. Vandamme, D., (2013). Flocculation based harvesting processes for microalgae biomass production. PhD Thesis, KU Leuven, online: www.vliz.be/imisdocs/publications/254002.pdf
98. Vandamme, D., Bueckels, A., Markou, G., Foubert, I., Muylaert, K., 2014. Reversible Flocculation of Microalgae using Magnesium Hydroxide. Bioeng. Res. DOI 10.1007/s12155-014-9554-1
99. Vandamme, D., Foubert, I., Fraeye, I., Meesschaert, B., Muylaert, K., 2012. Flocculation of *Chlorella vulgaris* induced by high pH: role of magnesium and calcium and practical implications. Bioresource Technology, vol. 105, pp. 114-119, 2012
100. Vandamme, D., Foubert, I., and Muylaert, K., (2013). Flocculation as a low-cost method for harvesting microalgae for bulk biomass production. Trends Biotechnol., 31(4): 233-239
101. Vandeperre, L J and Al Tabbaa, A., 2007. Accelerated carbonation of reactive MgO cements. Advances in Cement Research, 19. pp. 67-80.
102. Wauthier, C., Cayol, V., Kervyn, F., and d'Oreye, N., 2012. Magma sources involved in the 2002 Nyiragongo eruption, as inferred from an InSAR analysis. J. Geophys. Res., Solid Earth 119, B05411 DOI: 10.1029/2011JB008257.
103. Wolf-Gladrow, D. A., Zeebe, R. E., Klaas, C., Kortzinger, A., and Dickinson, A. G., (2007). Total alkalinity; the explicit conservative expression and its application to biogeochemical processes. Marine Chem., 106: 287-300
104. Woollat, G., Franco, F., 2009. Natural Gas Oxy-Fuel Cycles—Part 1: Conceptual and aerodynamic design of turbo-machinery components. Energy Procedia 1: 573-580.
105. Wright, R. F., (1983). Predicting acidification of North American lakes. NIVA Report 0-81036, Norwegian Institute for Water Research, online: http://brage.bibsys.no/xmlui/handle/11250/203402?show=full
106. Wu, Z., Zhu, Y., Huang, W., Zhang, C., Li, T., Zhang, Y., Li, A. 2012. Evaluation of flocculation induced by pH increase for harvesting microalgae and reuse of flocculated medium. Bioresource Technology, v. 110:496-502. doi: 10.1016/j.biortech.2012.01.101.
107. Wuest, A., Piepke, G., Halfman, J. D. 1996. In: The Limnology, Climatology and Paleoclimatology of the East African Lakes. pp. 183-202. Gordon and Breach. Toronto.
108. Wuest, A., Jarc, J., Schmid, M., 2009. Modelling the reinjection of deep-water after methane extraction in Lake Kivu. EAWAG Report (Kastanienbaum, Switzerland) (Available on Researchgate.)
109. Wuest, A., Jarc, J., Burgmann, H., Pasche, N., Schmid, M., 2012. Methane Formation and Future Extraction in Lake Kivu. pp. 165-180. Chapter 10 in: Descy ey al., 2012 Lake Kivu: Limnology and Biogeochemistry of a Tropical Great Lake. Springer.
110. Wurts, W. A., and Durborow, R. M., (1992). Interactions of pH, carbon dioxide, alkalinity and hardness in fish ponds. Southern Regional Aquaculture Center advisory note, online: http://www2.ca.uky.edu/wkrec/InteractionspHEtc.PDF
111. Xu, T., and Huang, C., (2008). Electrodialysis-based separation technologies: a critical review. AIChE J., 54(12): 3147-3159

112. Ying, K., Gilmour, D. J., and Zimmerman, W. B., (2014). Effects of CO2 and pH on growth of the microalga *Dunliella salina*. Microbial and Biochem. Technol., 6(3): 167-173
113. Zeebe, R. E., and Wolf-Gladrow, D., (2001). *CO2 in Seawater: Equilibrium, Kinetics, Isotopes*. Elsevier Oceanography Series, v. 65, pp. 346.
114. Zhou, H., Li, G., and Yao, S., (2014). A droplet-based pH regulator in microfluidics. Lab on a Chip, 14: 1917-1922
115. Zimmerman, W. 2011. Microbubbles keep green energy blooming. ANSYS Advantage, v. 1, Issue 1, pp 44-45.
116. Zimmerman, W., Zandi, M., Hemaka Bandulansena, H. C., Tesar, V., Gilmour, J., Ying, K. 2011. Design of an airlift loop bioreactor and pilot scale studies with fluidic oscillator induced microbubbles for growth of a microalgae *Dunaliella salina*. Applied Energy, v. 88: 3357-3369.

What is claimed is:

1. A method for treating water extracted from Lake Kivu, said method comprising the steps of:
    (a) extracting water from an extraction depth of Lake Kivu to obtain extracted water;
    (b) degassing the extracted water so as to remove at least a portion of carbon dioxide gas from the extracted water and provide degassed water having a density lower than the extracted water and having a pH higher than the extracted water;
    (c) photosynthetic treatment of the degassed water by growth of an algal biomass to convert bicarbonate anions to carbon dioxide and hydroxyl anions, such that the pH of the degassed water is increased and magnesium and calcium precipitate out of the degassed water to provide de-densified water and precipitate;
    (d) separating the de-densified water from the algal biomass and the precipitate;
    (e) optionally adjusting the pH of the de-densified water by adding carbon dioxide thereto, wherein the carbon dioxide is obtained from the degassing step and by combustion of methane also obtained in the degassing step; and
    (f) reinjecting into Lake Kivu a return flow of the de-densified water separated from the biomass and precipitate, wherein the de-densified water is reinjected into Lake Kivu at a reinjection depth which is shallower than the extraction depth and which is density-matched with the de-densified water.

2. The method of claim 1, wherein: (i) the portion of carbon dioxide gas removed from the extracted water in the degassing step is selected to control the pH of the water and thereby to control degrees of magnesium and calcium precipitation; and (ii) magnesium and calcium precipitates formed in the degassing step are separated from the degassed water.

3. The method of claim 1, wherein the extraction depth is at least within a main resource zone presently located more than about 260 meters below a surface of Lake Kivu and the reinjection depth is no deeper than 250 meters below the surface of Lake Kivu.

4. The method of claim 3, wherein the reinjection depth is no deeper than 200 meters below the surface of Lake Kivu.

5. The method of claim 3, wherein the reinjection depth is no deeper than 150 meters below the surface of Lake Kivu.

6. The method of claim 1, wherein the extracting step comprises extracting water from a plurality of different extraction depths, each of which is deeper than the reinjection depth.

7. The method of claim 1, wherein the degassing step comprises: (i) extracting dissolved methane from the extracted water at a first pressure where the carbon dioxide remains preferentially in solution; and subsequently (ii) extracting the carbon dioxide from the extracted water at a second pressure less than the first pressure.

8. The method of claim 1, wherein the degassing step comprises removing substantially all of the carbon dioxide gas from the extracted water.

9. The method of claim 1, wherein the degassing step comprises removing less than substantially all of the carbon dioxide gas from the extracted water and subsequently conducting the photosynthesis step at a pH lower than with total degassing of carbon dioxide.

10. The method of claim 9, wherein the photosynthesis step is conducted in at least two stages: (i) a first stage conducted with a first algae that raises the pH of the degassed water but does not precipitate most of the magnesium and calcium; and (ii) a second stage conducted with a second algae that consumes bicarbonate ions from the degassed water so as to facilitate full precipitation of magnesium and calcium therefrom, wherein the first and second stages are conducted in any order or simultaneously.

11. The method of claim 1, wherein the method promotes natural trophic stages which ultimately cultivate the growth of organisms that contain docosahexaenoic acid and/or eicosapentaenoic acid for harvesting.

12. The method of claim 1, wherein the method is staged to produce at least one crop of alkaline system algae and associated biomass.

13. A system for treating water extracted from Lake Kivu, said system comprising:
    (a) a water degassing system configured to extract water from an extraction depth of Lake Kivu to obtain extracted water and degas the extracted water so as to remove at least a portion of carbon dioxide gas therefrom and provide degassed water;
    (b) a water treatment system configured to: (i) photosynthetically treat the degassed water in a biomass containing algae to convert bicarbonate anions to carbon dioxide and hydroxyl anions, such that a pH of the degassed water is increased and magnesium and calcium precipitate out of the degassed water to provide de-densified water and precipitate; (ii) separate the de-densified water from the biomass and the precipitate; and optionally (iii) adjust the pH of the de-densified water by adding carbon dioxide thereto, wherein the carbon dioxide is obtained from the degassing step and by combustion of methane also obtained in the degassing step; and
    (c) a return flow system configured to reinject into Lake Kivu a return flow of the de-densified water separated from the biomass and precipitate, wherein the de-densified water is reinjected into Lake Kivu at a reinjection depth which is shallower than the extraction depth and which is density-matched with the de-densified water.

14. The system of claim 13, wherein the water degassing system comprises:
    an intake pipe system;
    at least one bubble capture unit positioned upwards along a system of degassing pipes;

at least one degassing catalyst unit positioned further upwards along the system of degassing pipes;

a bubbly flow turbine configured to capture and recycle power from jetting foam flow at a top of the system of degassing pipes, wherein the bubbly flow turbine is also configured to function as a foam separator;

at least one vacuum degassing unit positioned at the top of the system of degassing pipes; and a water flow turbine capturing and recycling power in a downward outflow of degassed water from the at least one vacuum degassing unit.

15. The system of claim 13, wherein the return flow system comprises:

an outflow pipe from the water degassing system;

pipe systems connecting flow to the water treatment system;

a return flow pipe system and horizontal diffuser to reinject degassed water into Lake Kivu at a specified depth; and flow control valve systems with emergency shut-off capabilities.

16. The system of claim 13, wherein the water treatment system is further configured to: (i) control the portion of carbon dioxide gas removed from the extracted water in the degassing step to control the pH of the extracted water and thereby to control degrees of magnesium and calcium precipitation; and (ii) separate from the degassed water and recover magnesium and calcium precipitates formed in the degassing step.

\* \* \* \* \*